United States Patent
Waghmare et al.

(10) Patent No.: US 11,921,481 B2
(45) Date of Patent: Mar. 5, 2024

(54) SYSTEMS AND METHODS FOR DETERMINING EQUIPMENT ENERGY WASTE

(71) Applicant: Johnson Controls Tyco IP Holdings LLP, Milwaukee, WI (US)

(72) Inventors: Tulshiram Waghmare, Pune (IN); Subrata Bhattacharya, Singapore (SG); Braja Majumder, Hooghly (IN); Dilip Divila, Khammam (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 13 days.

(21) Appl. No.: 17/697,772

(22) Filed: Mar. 17, 2022

(65) Prior Publication Data
US 2022/0299963 A1    Sep. 22, 2022

(30) Foreign Application Priority Data
Mar. 17, 2021 (IN) .............................. 202121011425

(51) Int. Cl.
*G05B 19/042* (2006.01)
(52) U.S. Cl.
CPC .. *G05B 19/042* (2013.01); *G05B 2219/25011* (2013.01); *G05B 2219/2614* (2013.01)
(58) Field of Classification Search
CPC ........ G05B 19/042; G05B 2219/25011; G05B 2219/2614; G05B 23/0267; G05B 2219/2642; G05B 23/0245
See application file for complete search history.

(56) References Cited

U.S. PATENT DOCUMENTS

| | | |
|---|---|---|
| 5,301,109 A | 4/1994 | Landauer et al. |
| 5,446,677 A | 8/1995 | Jensen et al. |
| 5,581,478 A | 12/1996 | Cruse et al. |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

U.S. Appl. No. 17/537,046, filed Nov. 29, 2021.

(Continued)

*Primary Examiner* — Michael W Choi
(74) *Attorney, Agent, or Firm* — Foley & Lardner LLP

(57) ABSTRACT

A building management system (BMS) includes one or more memory devices having instructions stored thereon that, when executed by one or more processors, cause the one or more processors to perform operations including using the operating data to evaluate one or more fault detection rules to determine whether at least one of the plurality of building devices is experiencing a fault condition, in response to determining that at least one of the plurality of building devices is experiencing the fault condition, determining an amount of carbon emissions generated due to the fault condition based on a fault emissions model associated with the fault condition and initiating an automated response based on the amount of carbon emissions associated with the fault condition.

19 Claims, 26 Drawing Sheets

(56) References Cited

U.S. PATENT DOCUMENTS

| | | |
|---|---|---|
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,930,144 B2 | 4/2011 | McConnell et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | MacKay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,447,985 B2 | 9/2016 | Johnson |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,289,107 B2 | 5/2019 | Warner et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,544,954 B2 | 1/2020 | Lazar |
| 10,649,419 B2 | 5/2020 | Asp et al. |
| 10,705,492 B2 | 7/2020 | Harvey |
| 10,708,078 B2 | 7/2020 | Harvey |
| 10,739,027 B2 | 8/2020 | Abiprojo et al. |
| 10,845,771 B2 | 11/2020 | Harvey |
| 10,845,791 B2 | 11/2020 | Cohen et al. |
| 10,854,194 B2 | 12/2020 | Park et al. |
| 10,862,928 B1 | 12/2020 | Badawy et al. |
| 10,871,756 B2 | 12/2020 | Johnson et al. |
| 10,908,578 B2 | 2/2021 | Johnson et al. |
| 10,921,760 B2 | 2/2021 | Harvey |
| 10,921,768 B2 | 2/2021 | Johnson et al. |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,156,978 B2 | 10/2021 | Johnson et al. |
| 11,229,138 B1 | 1/2022 | Harvey et al. |
| 11,281,169 B2 | 3/2022 | Chatterjee et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |

(56) References Cited

U.S. PATENT DOCUMENTS

| | | |
|---|---|---|
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0100521 A1* | 4/2010 | Fujimaki ............ G06F 11/2257 706/47 |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | MacKay et al. |
| 2011/0087988 A1 | 4/2011 | Ray et al. |
| 2011/0088000 A1 | 4/2011 | MacKay |
| 2011/0125737 A1 | 5/2011 | Pothering et al. |
| 2011/0137853 A1 | 6/2011 | MacKay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0245968 A1 | 9/2012 | Beaulieu et al. |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0114867 A1* | 4/2014 | Volkmann ............ G06Q 10/30 705/308 |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0316743 A1* | 10/2014 | Drees .................... G05B 15/02 702/183 |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0227870 A1* | 8/2015 | Noboa ............... G06Q 10/0635 705/7.28 |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0338314 A1 | 11/2015 | Meyer |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |

(56) References Cited

U.S. PATENT DOCUMENTS

| | | |
|---|---|---|
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0025809 A1* | 1/2019 | Bhattacharya ......... G06N 5/046 |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0368759 A1 | 12/2019 | Dempster et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| CN | 109264522 A | 1/2019 |
| DE | 10 2007 051 347 A1 | 7/2009 |
| EP | 2 528 033 A1 | 11/2012 |
| EP | 3 186 687 A4 | 7/2017 |
| EP | 3 324 306 A1 | 5/2018 |
| EP | 3 497 377 A1 | 6/2019 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

Envizi, "Equipment Fault Detection," URL: https://envizi.com/wp-content/uploads/2016/02/ENVIZI_BROCHURE_MODULE_EFD.pdf, 2016 (4 pages).

International Search Report and Written Opinion on PCT Appl. No. PCT/US2022/020808 dated Jul. 7, 2022 (16 pages).

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

(56) References Cited

OTHER PUBLICATIONS

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "Jla Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents

(56) References Cited

OTHER PUBLICATIONS filed Jan. 26, 2023-Oct. 7, 2022), and IPR2023-00085 (documents filed Jan. 26, 2023-Oct. 7, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).

(56) References Cited

OTHER PUBLICATIONS

The Virtual Nuclear Tourist, "Calvert Cliffs Nuclear Power Plant," URL: http://www.nucleartourist.com/us/calvert.htm, Jan. 11, 2006 (2 pages).

University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Zhou, Q. et al., "Knowledge-infused and Consistent Complex Event Processing over Real-time and Persistent Streams," Further Generation Computer Systems, 2017, 76 (pp. 391-406).

\* cited by examiner

FIG. 8

Equipment Category: All
Space Name: All
Fault Category: All
Fault Priority: All

900 →
902 →

| Equipment | Space Name | Fault Name | Latest Occurrence Time | Fault Category | Fault Priority | Duration (Hrs) | Electrical Energy Savings Potential (KWh) | Thermal Energy Savings Potential (KWh) | Cost Savings Potential (USD) |
|---|---|---|---|---|---|---|---|---|---|
| RMU-AB-BL-V03 | ATLANTA AIRPORT > Concourse A > Boarding Level > Acon Boarding Level - ASI | VAV-FD-004 VAV Low Supply Air Flow - Reh... | 03-04-2020 17:00:11 | Comfort | Medium | 77.49 | - | - | No Cost Mapped |
| RMU-AB-BL-V03 | ATLANTA AIRPORT > Concourse A > Boarding Level > Acon Boarding Level - ASI | VAV-FD-007 High Zone Temperature - Reheat | 03-04-2020 17:00:11 | Comfort | High | 77.49 | - | - | No Cost Mapped |
| RMU-AB-BL-V03 | ATLANTA AIRPORT > Concourse A > Boarding Level > Acon Boarding Level - ASI | VAV reheat valve passing in occupied period | 03-04-2020 17:00:11 | Energy | High | 77.49 | 0 | 2934.94 | 44.02 |
| RMU-AB-BL-V03 | ATLANTA AIRPORT > Concourse A > Boarding Level > Acon Boarding Level - ASI | E3 Hot water valve leaking or stuck open (VAV... | 03-04-2020 17:00:11 | Comfort | Medium | 75.63 | - | - | No Cost Mapped |
| RMU-93A-V13 | ATLANTA AIRPORT > Concourse A > Boarding Level > Acon Boarding Level - A2 | VAV-FD-004 VAV Low Supply Air Flow - Reh... | 03-04-2020 17:00:11 | Comfort | Medium | 71.74 | - | - | No Cost Mapped |
| RMU-93A-V13 | ATLANTA AIRPORT > Concourse A > Boarding Level > Acon Boarding Level - A2 | E3 Hot water valve leaking or stuck open (VAV... | 03-04-2020 17:00:11 | Comfort | Medium | 69.53 | - | - | No Cost Mapped |
| RMU-93A-V13 | ATLANTA AIRPORT > Concourse A > Boarding Level > Acon Boarding Level - A2 | VAV-FD-007 High Zone Temperature - Reheat | 03-04-2020 17:00:11 | Comfort | High | 68.49 | - | - | No Cost Mapped |

Point configuration

FQR / Point path  ADX-1:507-B3PH-NAE01/BACnet IP B3F4 VMAs.507-B3F4-VAV-01.DA-VP Name *  1102— 507-B3F4-VAV-01.DA-VP Unit type *  1104— Pressure Point role *  1106— Pressure Min value *  -1000000

Read frequency *  1108— 15 minute

Unit *  Inches of water

Series type *  1110— Instantaneous

Max value *  1000000

[Update] [Cancel]

Faults — 1400

Q Q ⊕ ✉ Email + Work Order ⬇ Download — 1402

| ☐ Priority | Category | Equipment Name | Fault Name | First Occurrence | Latest Occurrence | Count | Duration (Hrs) | Est. Cost Impact | Est. Electrical Saving (kWh) | Est Thermal Saving (kBTU) | Est CarbonEmission Saving (MT CO2e) | Work Order Status | Notes |
|---|---|---|---|---|---|---|---|---|---|---|---|---|---|
| ☐ Critical | Comfort | Sun Valley Mall AHU-FK-3 | AHU Low Zone Temperature | 10/20/2021 | 11/04/2021 | 50 | 180.02 | 523.23 | 5,675 | 120 | 40 | Open | View |
| ☐ Critical | Energy | Mountain View AHU-FK-4 | High Static Pressure | 10/23/2021 | 10/31/2021 | 12 | 63.06 | 515.53 | 4,7569 | 89 | 30 | In Progress | View |
| ☐ Critical | Energy | Sun Valley Mall AHU-FK-3 | AHU Insufficient Cooling Capacity | 10/08/2021 | 10/19/2021 | 42 | 130.02 | 145.00 | 348 | 10 | 5 | New | View |
| ☐ High | Comfort | Sun Valley Mall AHU-FK-3 | High Zone Temperature | 09/30/2021 | 10/18/2021 | 14 | 19.0 | 98.88 | 688 | 0 | 1 | In Progress | View |
| ☐ High | Maintenance | Mountain View F1-VMA-4 | VAV Unexpected Value: Zone Temp | 10/15/2021 | 11/01/2021 | 87 | 37.62 | 96.88 | 670 | 0 | 1 | Open | View |
| ☐ High | Comfort | Garden Suites VMA-12 | VAV Air Supply Less Than Set Value | 10/29/2021 | 10/30/2021 | 34 | 64.89 | 32.99 | 300 | 0 | 0.5 | New | View |
| ☐ High | Comfort | Sun Valley Mall AHU-FK-3 | Low Zone Temperature | 10/08/2021 | 12/19/2021 | 43 | 15.97 | 523.23 | 5,675 | 120 | 40 | In Progress | View |
| ☐ High | Maintenance | Sun Valley Mall AHU-FK2 | Cooling Valve Stuck | 10/30/2021 | 11/02/2021 | 23 | 12.25 | 65.55 | 569 | 20 | 10 | New | View |
| ☐ High | Energy | Mountain View YK-CH-1 | High Oil Temp with Chiller Shutdown | 10/07/2021 | 10/26/2021 | 54 | 120.25 | 6.77 | 60 | - | 0.005 | In Progress | View |
| ☐ High | Maintenance | Garden Suites VMA-2-13 | VAV Unexpected Value: Zone Temp | 09/12/2021 | 10/21/2021 | 32 | 23.75 | 83.46 | 870 | - | 2 | In Progress | View |
| ☐ High | Energy | Sun Valley Mall AHU-FK-3 | Low Static Pressure | 10/20/2021 | 10/25/2021 | 25 | 59.43 | 32.99 | 298 | - | 0.5 | Open | View |

FIG. 14

| # | Equipment Category | Parent Fault Name | Priority | Electrical Cost Rule (kWh) for Ventilation & Cooling Energy | Remark | Thermal Cost Rule (kBtu) for Heating Energy | Remark |
|---|---|---|---|---|---|---|---|
| 1 | Air Handling Unit | AHU-FD-002 High Static Pressure | Critical | MAX(0,((Supply Air Flow*(Supply Air Static Pressure-Supply Air Pressure Setpoint)/ (6356*0.75))*0.746)) | Fan Efficiency - 0.75<br>0.746 - HP to kW<br>Flow unit = CFM<br>Pressure unit = Inches of water | MAX(0,((0.3*1.08*(Heating Output/100)*Supply Air Flow*(Supply Air Temperature-Mixed-Air Temperature)/1000))) | Considering 30 % wastage in heating due to high static pressure<br>Flow unit = CFM<br>Output unit = %<br>Temperature unit = Degree F |
| 2 | Air Handling Unit | AHU-FD-021 Economy cycle not running | Medium | MAX(0,(((4.5*Outside Air Flow*Outside Air Enthalpy)/12000)*0.85)) | Flow unit = CFM<br>Enthalpy unit = KJ/KG | N/A | |
| 3 | Air Handling Unit | AHU-FD-028 VFD permanently at full load | Medium | (MAX(0,((((Supply Air Flow*(Supply Air Static Pressure-Supply Air Pressure Setpoint)/(6356*0.75))+((Supply Air Flow/400)*0.03*0.85)))) | Chiller plant efficiency -0.85 kW/TR<br>Flow unit = CFM<br>Pressure unit = Inches of water | MAX(0,((0.3*1.08*(Heating Output/100)*Supply Air Flow*(Supply Air Temperature-Mixed-Air Temperature)/1000))) | Considering 30 % wastage in heating due to high static pressure<br>Flow unit = CFM<br>Output unit = %<br>Temperature unit = Degree F |
| 4 | Air Handling Unit | AHU-FD-030 Low Zone Temperature | High | (MAX(0,((((1.08*Supply Air Flow*(Space Temperature Setpoint-MASD-Space Temperature- MASD))/12000)*0.85)* (Cooling Output/CoolingOutput)))) | Chiller plant efficiency -0.85 kW/TR<br>1.5 % improvement per Deg F<br>Flow unit = CFM<br>Output unit = %<br>Temperature unit = Degree F | N/A | |

FIG. 15A

| # | Equipment Category | Parent Fault Name | Priority | Electrical Cost Rule (kWh) for Ventilation & Cooling Energy | Remark | Thermal Cost Rule (kBtu) for Heating Energy | Remark |
|---|---|---|---|---|---|---|---|
| 5 | Air Handling Unit | AHU-FD-031 Simultaneous heating and cooling operation. | High | MAX(0,((Supply Air Flow/400)*(Cooling Output/100)*0.85*0.8))) | Chiller plant efficiency - 0.85 kW/Ton, 400 cfm = 1 Ton, 80% confidence factor Flow unit = CFM Output unit = % | MAX(0,(((Heating Output/100)*Const(Heating Capacity(MBH)))*0.85*0.8)) | Boiler Efficiency - 85% Confidence factor 80% Output unit = % Heating capacity unit = MBH |
| 6 | Air Handling Unit | AHU-FD-053 CO2 level is too low | Medium | MAX(0,((1.08*(Supply Air Flow*(Outdoor Air Damper output-20)/100))*(Outside Air Temperature-Supply Air Temperature)/12000)*0.85)) | 20% minimum Outside air damper position and calculation uses sensible heat saving only. Flow unit = CFM Output unit = % Temperature unit = Degree F | MAX(0,((1.08*(Supply Air Flow*(Outdoor Air Damper output- 20))*(Supply Air Temperature- Outside Air Temperature)/1000)) | 20% minimum Outside air damper position Flow unit = CFM Output unit = % Temperature unit = Degree F |
| 7 | Fan Coil Unit | FCU-FD-002 Low Zone Temperature | High | ((MAX(0,((((1.08*Const(FCUDESIGNFLOW)* (Zone Temperature Setpoint-Zone Temperature))/12000)*0.85)*(Cooling Output/Cooling Output))) | Chiller plant efficiency - 0.85 kW/TR FCUDESIGNFLOW unit = CFM Output unit = % Temperature unit = Degree F | N/A | |

FIG. 15B

| # | Equipment Category | Parent Fault Name | Priority | Electrical Cost Rule (kWh) for Ventilation & Cooling Energy | Remark | Thermal Cost Rule (kBtu) for Heating Energy | Remark |
|---|---|---|---|---|---|---|---|
| 8 | Roof Top Unit | RTU-FD-021 Outside and return air dampers both open high | Low | MAX(0,(((1.08*Supply Air Flow*(Outdoor Air Damper Output-20))*(Outdoor Air Temperature-Supply Air Temperature))/12000)*0.85)) | 20% minimum outside air damper position and calculation uses sensible heat saving only. Flow unit = CFM Output unit = % Temperature unit = Degree F | MAX(0,(((1.08*Supply Air Flow*(Outdoor Air Damper Output-20))*(Supply Air Temperature-Outdoor Air Temperature))/1000)) | 20% minimum Outside air damper position Flow unit = CFM Output unit = % Temperature unit = Degree F |
| 9 | Roof Top Unit | RTU-FD-028 Low Zone Temperature | High | MAX(0,((1.08*Supply Air Flow*(Zone Average Temperature Set point-Zone Average Temperature))/12000)*1.2)) | RTU efficiency considered = 1.2 kW/TR Upto 25 TR York RTU has design efficiency of 1.09 kW/TR 1.5% improvement per Deg F Flow unit = CFM Output unit = % Temperature unit = Degree F | N/A | |
| 10 | Chilled Water Pumps | CHW-PP-FD-002 Pump Operation at High Speed | High | (MAX(0,(Primary Chilled water Pump VSD Power)-(Primary Chilled water Pump VSD Power(((Primary Chilled Water Pump Speed Drive Output/Const(High Speed Threshold - CHWP))*(Primary Chilled Water Pump Speed Drive Output/Const(High Speed Threshold - CHWP))*(Primary Chilled Water Pump Speed Drive Output/Const(High Speed Threshold - CHWP))))) | Power unit = kW Output unit = % | NA | |

FIG. 15C

| # | Equipment Category | Parent Fault Name | Priority | Electrical Cost Rule (kWh) for Ventilation & Cooling Energy | Remark | Thermal Cost Rule (kBtu) for Heating Energy | Remark |
|---|---|---|---|---|---|---|---|
| 11 | Chiller | Poor Plant Efficiency | High | MAX(0,(MIN(500,((Total Plant Room System Efficiency-Const(CHW Plant SYS Efficiency-Design)*Const(Design Efficiency Multiplier))*Total Chiller Load))))) | Total Plant Room System Efficiency = kW/TR Total Chiller Load= TR | NA | |
| 12 | Chiller | High Condenser Water Header Supply Temperature | High | MAX(0,(MIN(500,((Condenser Water Header Supply Temperature-29.5)*0.03*Total Chiller Power))))) | Condenser Water Header Supply Temperature = Deg F Total Chiller Power= kW | NA | |
| 13 | Air Handling Unit | AHU Return Air Temperature is too Cold | High | MAX(0,(MIN(40,(0.0002*Const(RAT LowLimit)-Return Air Temperature)*((40/50)*Const(AHU Design Airflow))))))) | Return Air Temperature = Deg F AHU Design Airflow= cfm | NA | |

Commodity units & Currency selection

| | | | | |
|---|---|---|---|---|
| Fuel oil | kL ▷ | US Dollar Per kL | 10 | 1 ▷ |
| Fuel oil | kL ▷ | US Dollar Per kL | 0 | 1 ▷ |
| Propane | kL ▷ | US Dollar Per kL | 0 | 1 ▷ |
| Diesel | kL ▷ | US Dollar Per Gal | 0 | 1 ▷ |
| Sewage | US Gal ▷ | US Dollar Per Gal | 0 | 1 ▷ |
| Coal | Select Units ▷ | US Dollar Per kBtu | 0 | 1 ▷ |
| Thermal Overall * | kBtu ▷ | US Dollar Per kBtu | 0.015 | |
| Carbon emission factor for electricity(kilowatt-hours) | 0.00069 tons of CO2 emissions | Temperature * | Fahrenheit ▷ | |
| Building Load * | TR ▷ | Efficiency * | kW/TR ▷ | |

Submit  Cancel  Clear

FIG. 16

SYSTEMS AND METHODS FOR DETERMINING EQUIPMENT ENERGY WASTE

CROSS-REFERENCE TO RELATED PATENT APPLICATIONS

This application claims the benefit of and priority to Indian Provisional Patent Application No. 202121011425, filed Mar. 17, 2021, the entirety of which is incorporated by reference herein.

BACKGROUND

The present disclosure relates generally to building management systems (BMSs), and more specifically to determining an amount of energy wasted by building equipment due to a fault or alarm condition.

In various implementations, a BMS operates by monitoring and controlling a wide variety building subsystems and equipment. A BMS can improve building operations, and can allow building owners or operators to meeting various operating goals, by increasing building (e.g., system and equipment) efficiency, decreasing operating costs, reducing user input (e.g., through automation), reducing downtime, etc. Building equipment, such as the equipment included in a BMS, may occasionally experience fault conditions that result in decreased efficiency and unexpected downtime, which in turn may result in a waste of energy (e.g., electricity). Thus, it would be beneficial to determine not only an amount of energy wasted in a fault condition, but also a cost associated with the fault and an amount of emissions generated due to the fault.

SUMMARY

One implementation of the present disclosure is a building management system (BMS) that includes one or more memory devices having instructions stored thereon that, when executed by one or more processors, cause the one or more processors to perform operations including using the operating data to evaluate one or more fault detection rules to determine whether at least one of the plurality of building devices is experiencing a fault condition, in response to determining that at least one of the plurality of building devices is experiencing the fault condition, determining an amount of carbon emissions generated due to the fault condition based on a fault emissions model associated with the fault condition and initiating an automated response based on the amount of carbon emissions associated with the fault condition.

In some embodiments, the operations further include obtaining at least one of the one or more fault detection rules based on a user input and mapping the one or more fault detection rules to the plurality of building devices.

In some embodiments, the user input comprises a description of a fault associated with a fault detection rule of the one or more fault detection rules, a priority of the fault, and an equation defining the fault detection rule.

In some embodiments, the operations further include modifying the fault emissions model based on units of measurement associated with the operating data, wherein the fault emissions model is modified such that each term of the fault emissions model is defined by a common unit of measurement.

In some embodiments, the operations further include calculating an amount of energy wasted due to the fault condition based the fault emissions model associated with the fault condition, wherein the amount of carbon emissions generated is determined based on the amount of energy wasted and energy mix information including the energy sources used to generate the wasted energy.

In some embodiments, the amount of energy wasted due to a fault condition in a first building device includes additional energy consumed by a second building device because of the fault condition in the first building device.

In some embodiments, the automated response includes generating a work order to correct the fault condition, the work order identifying the at least one of the plurality of building devices experiencing the fault condition and comprising a description of the fault and a location of the at least one of the plurality of building devices.

In some embodiments, the automated response includes generating a graphical user interface based on the fault condition, the graphical user interface comprising an indication of the fault condition, an indication of the at least one of the plurality of building devices experiencing the fault condition, and an indication of the emissions generated and displaying the graphical user interface via a user device.

In some embodiments, the automated response includes generating an alert based on the detection of the fault condition, the alert comprising an indication of a priority of the fault condition, wherein the priority is determined based on a amount of emissions generated due to the fault and transmitting the alert to a user device.

Another implementation of the present disclosure is a method of determining an amount of energy wasted due to a fault condition in a building management system (BMS). The method includes obtaining operating data from a plurality of building devices, using the operating data to evaluate on one or more fault detection rules to determine whether at least one of the plurality of building devices is experiencing the fault condition, in response to determining that at least one of the plurality of building devices is experiencing the fault condition, determining an amount of carbon emissions generated due to the fault condition based on a fault emissions model associated with the fault condition and initiating an automated response based on the cost associated with the fault condition.

In some embodiments, the method further includes receiving, via a user input to a user device, at least one of the one or more fault detection rules and mapping the one or more fault detection rules to the plurality of building devices.

In some embodiments, the user input includes a description of a fault associated with a fault detection rule of the one or more fault detection rules, a priority of the fault, and an equation defining the fault detection rule.

In some embodiments, the method further includes comprising modifying the fault emissions model based on units of measurement associated with the operating data, wherein the fault emissions model is modified such that each term of the fault emissions model is defined by a common unit of measurement.

In some embodiments, the method further includes calculating the amount of energy wasted due to the fault condition based the fault emissions model associated with the fault condition and energy mix information, wherein the amount of energy wasted is determined by comparing a first amount of energy consumed by the at least one of the plurality of building devices over a time period of the fault condition with a second amount of energy consumed by the at least one of the plurality of building devices during a time period of normal operation, and wherein the amount of carbon emissions generated is determined based on the amount of energy wasted and energy mix information including the energy sources used to generate the wasted energy.

In some embodiments, the amount of energy wasted due to a fault condition in a first building device includes additional energy consumed by a second building device because of the fault in the first building device.

In some embodiments, the automated response includes generating a work order to correct the fault condition, the work order identifying the at least one of the plurality of building devices experiencing the fault condition and comprising a description of the fault and a location of the at least one of the plurality of building devices.

In some embodiments, the automated response includes generating a graphical user interface based on the fault condition, the graphical user interface comprising an indication of the fault condition, an indication of the at least one of the plurality of building devices experiencing the fault condition, and an indication of the emissions generated, and displaying the graphical user interface via a user device.

In some embodiments, the automated response includes generating an alert based on the detection of the fault condition, the alert comprising an indication of a priority of the fault condition, wherein the priority is determined based on the amount of emissions generated due to the fault and transmitting the alert to a user device.

Yet another implementation of the present disclosure is a fault detection system including one or more memory devices having instructions stored thereon that, when executed by one or more processors, cause the one or more processors to perform operations including receiving, via a user input, at least one fault detection rule, the at least one fault detection rule comprising an equation defining the at least one fault detection rule, mapping the at least one fault detection rule to one or more building devices, obtaining operating data from the one or more building devices, using the operating data to evaluate the at least one fault detection rule to determine that a building device of the one or more building devices is experiencing a fault condition, determining an amount of energy wasted due to the fault condition based on a fault emissions model associated with the fault condition, and calculating an amount of carbon emissions generated due to the fault condition based on the amount of energy wasted and energy mix information.

In some embodiments, operations further include initiating an automated response based on the fault condition, the automated response comprising generating a work order to correct the fault condition, the work order identifying the building device experiencing the fault condition and comprising a description of the fault and a location of the building device.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8 is an example interface for establishing fault detection rules, according to some embodiments.

FIG. 9 is an example interface for viewing fault data, according to some embodiments.

FIG. 10 is an example interface for work order management, according to some embodiments.

FIG. 11 is an example interface for setting the read frequency of a data point, according to some embodiments.

FIG. 13 is an example interface for establishing fault detection rules, according to some embodiments.

FIG. 14 is an example interface for viewing fault data, according to some embodiments.

FIGS. 15A-15D is a table showing example electrical and thermal cost rules, according to some embodiments.

FIG. 16 is an example interface for entering the cost and carbon emission of energy sources is shown, according to some embodiments.

DETAILED DESCRIPTION

Figure 1:
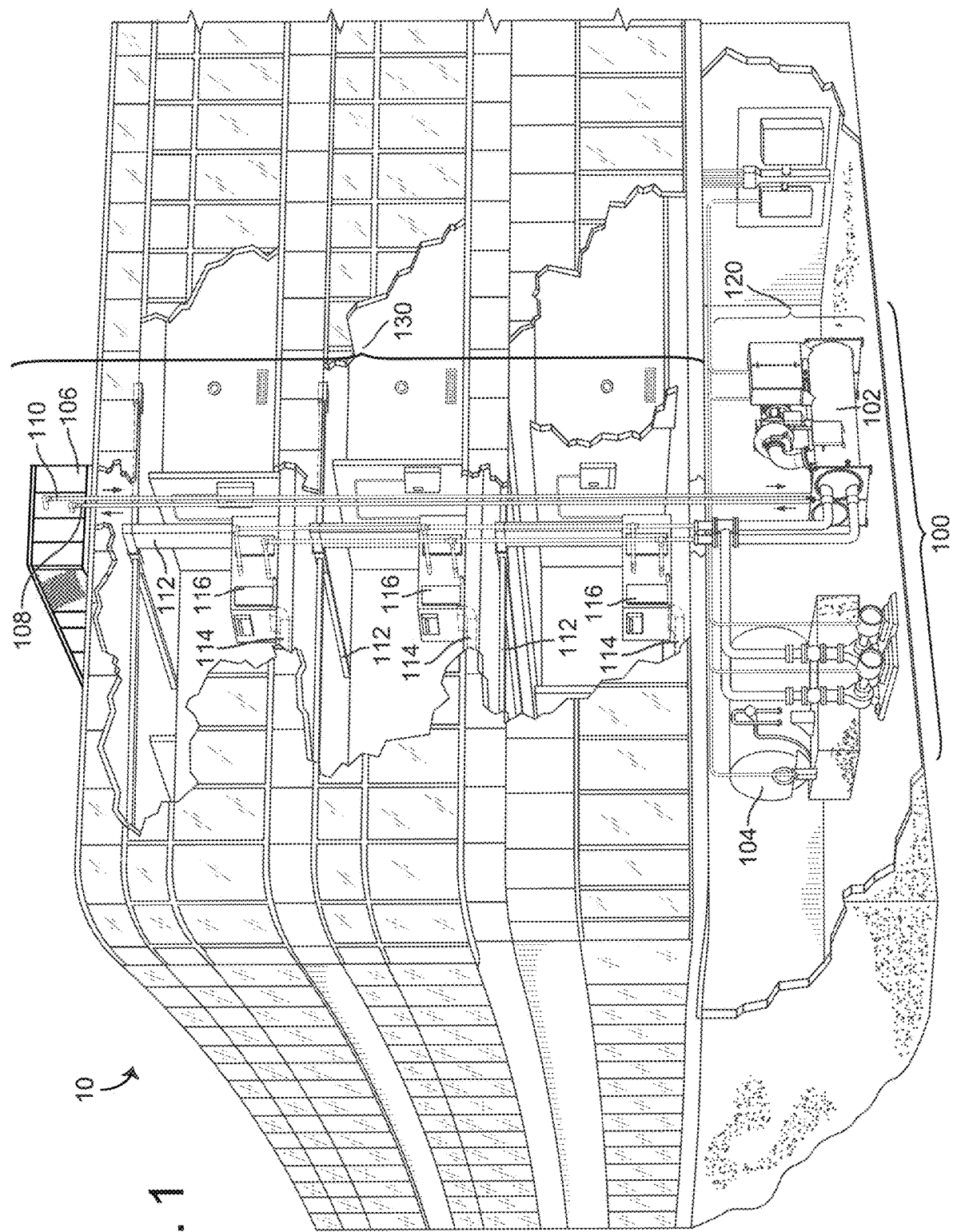
FIG. 1 is a drawing of a building equipped with a HVAC system, according to some embodiments.

Referring generally to the FIGURES, a system and methods for fault detection and fault cost determination are shown, according to some embodiments. In particular, a fault detection system may maintain a database of fault detection rules, each of which can be mapped to a corresponding building device, system, subsystem, etc. At regular or irregular time intervals (e.g., every second, every minute, every day, intermittently, on demand, etc.), building equipment operating data may be collected and analyzed with respect to the fault detection rules, to determine whether one or more building devices are experiencing a fault (e.g., by meeting certain criteria associated with a fault detection rule).

In the event that a building device is determined to be experiencing a fault (i.e., the building device is in a fault state), the fault detection system may be configured to determine an amount of energy (e.g., electrical, thermal, etc.) that is wasted over the duration of the fault. Energy may be wasted due to, for example, the building device operating inefficiently or additional building devices operating at a greater volume to compensate for the device in the fault state. Once an amount of energy wastage is determined, the fault detection system may calculate a cost associated with the wasted energy, based on current costs or rates for the associated energy resources (e.g., electricity, natural gas, etc.). For example, a chiller of a building HVAC system experiencing a fault condition for half an hour may waste X kWh of electricity, which was purchased from an energy provider (e.g., a power company) at Y dollars per kWh. Thus, the cost of the fault condition may be determined as the total number of dollars associated with the wasted energy. The fault detection system may also calculate an amount of emissions generated due to the fault, based on the type of energy source and the duration of the fault.

In some embodiments, upon detection of a fault and/or responsive to the determination of a cost associated with the fault and/or the emissions generated due to the fault, one or more automated response actions may be initiated. In some such embodiments, an automated action includes generating a work order instructing a technician or other user to correct the fault condition. A work order may include an identification of the building device experiencing the fault condition, and may also include a description of the fault and a location of the building device. In some embodiments, generating the work order may also include automatically scheduling a visit from the technician. In some embodiments, the automated actions can include generating and displaying various user interfaces that present information relating to the detected fault and the costs associated with the fault and/or the emissions generated due to the fault. Accordingly, fault conditions may be quickly resolved and, in some cases, high priority, high cost, and/or high-emission faults can be identified and corrected more urgently than other faults.

Building with Building Systems

Referring now to FIGS. 1-4, an exemplary BMS and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire safety system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
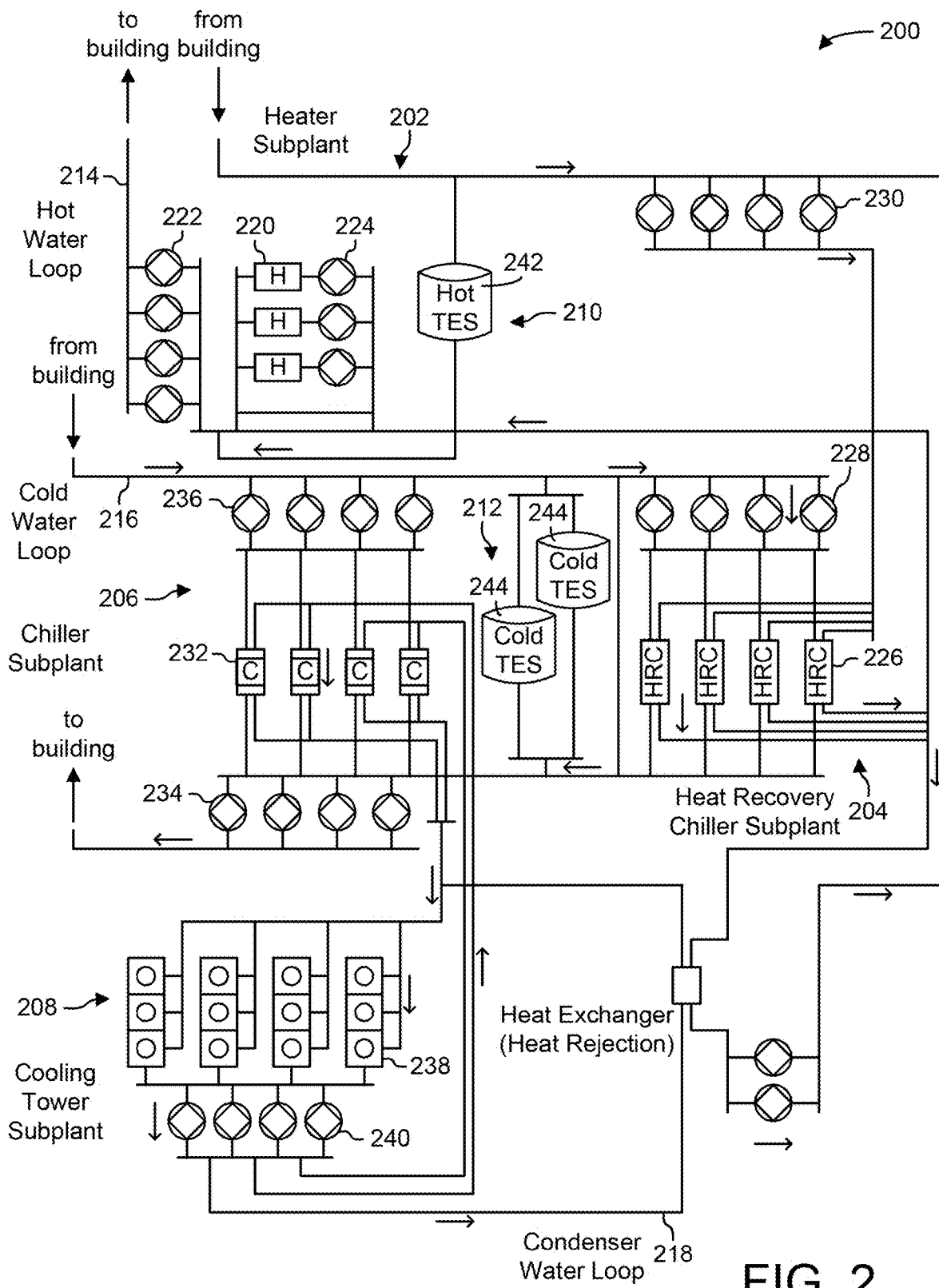
FIG. 2 is a block diagram of a waterside system that may be used in conjunction with the building of FIG. 1, according to some embodiments.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
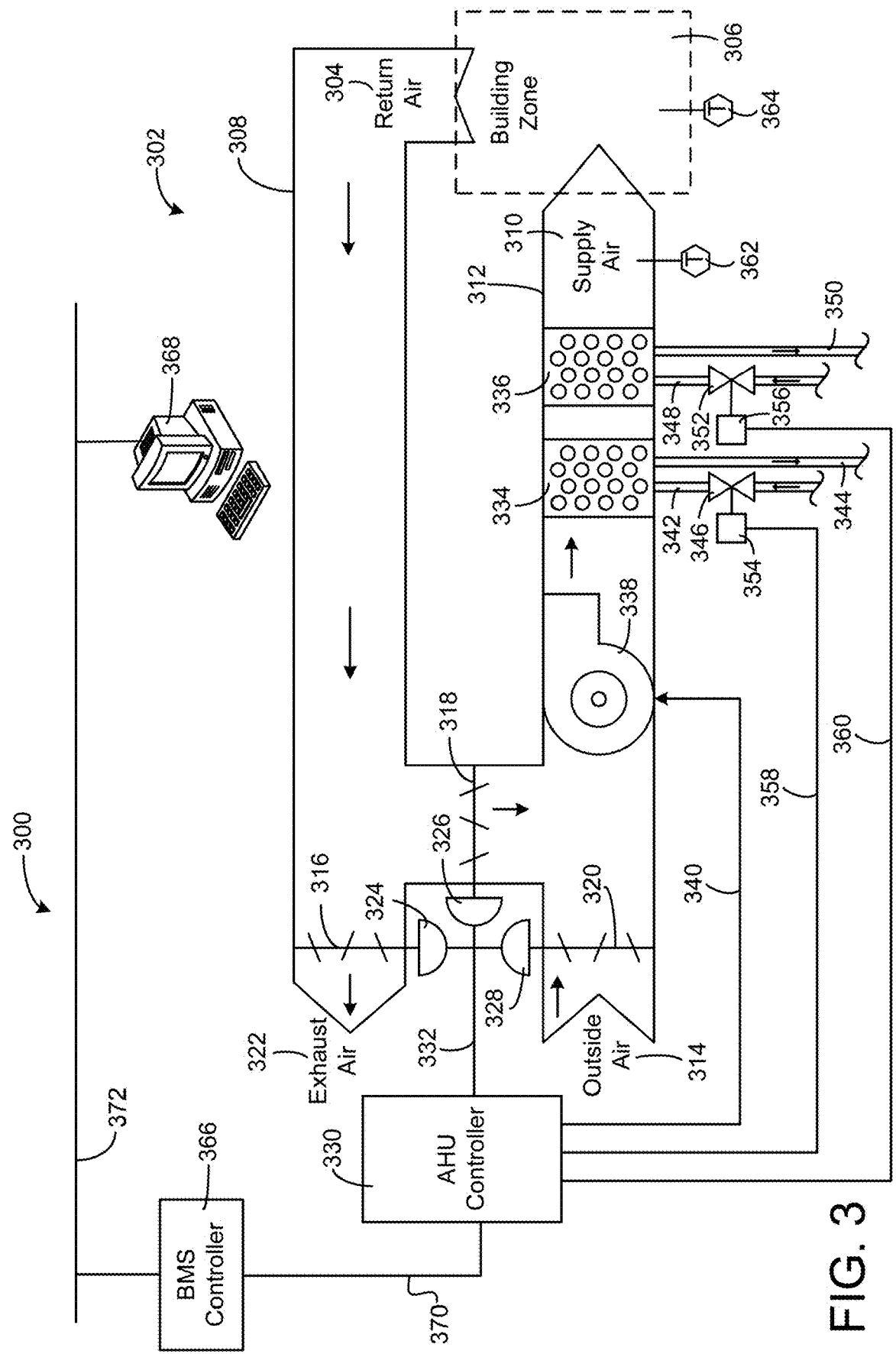
FIG. 3 is a block diagram of an airside system that may be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
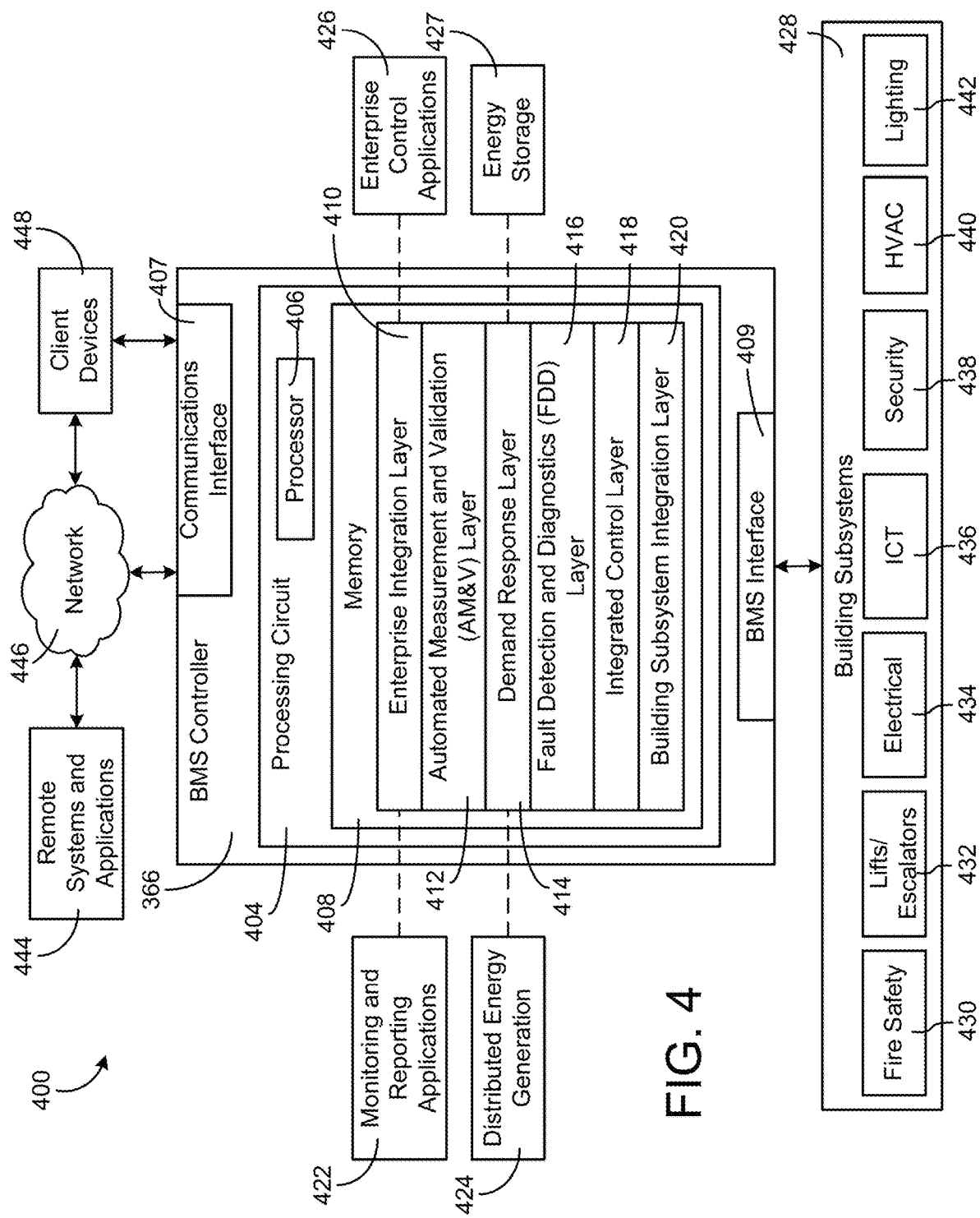
FIG. 4 is a block diagram of a building management system (BMS) that may be used to monitor and/or control the building of FIG. 1, according to some embodiments.

Referring now to FIG. 4, a block diagram of a building automation system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
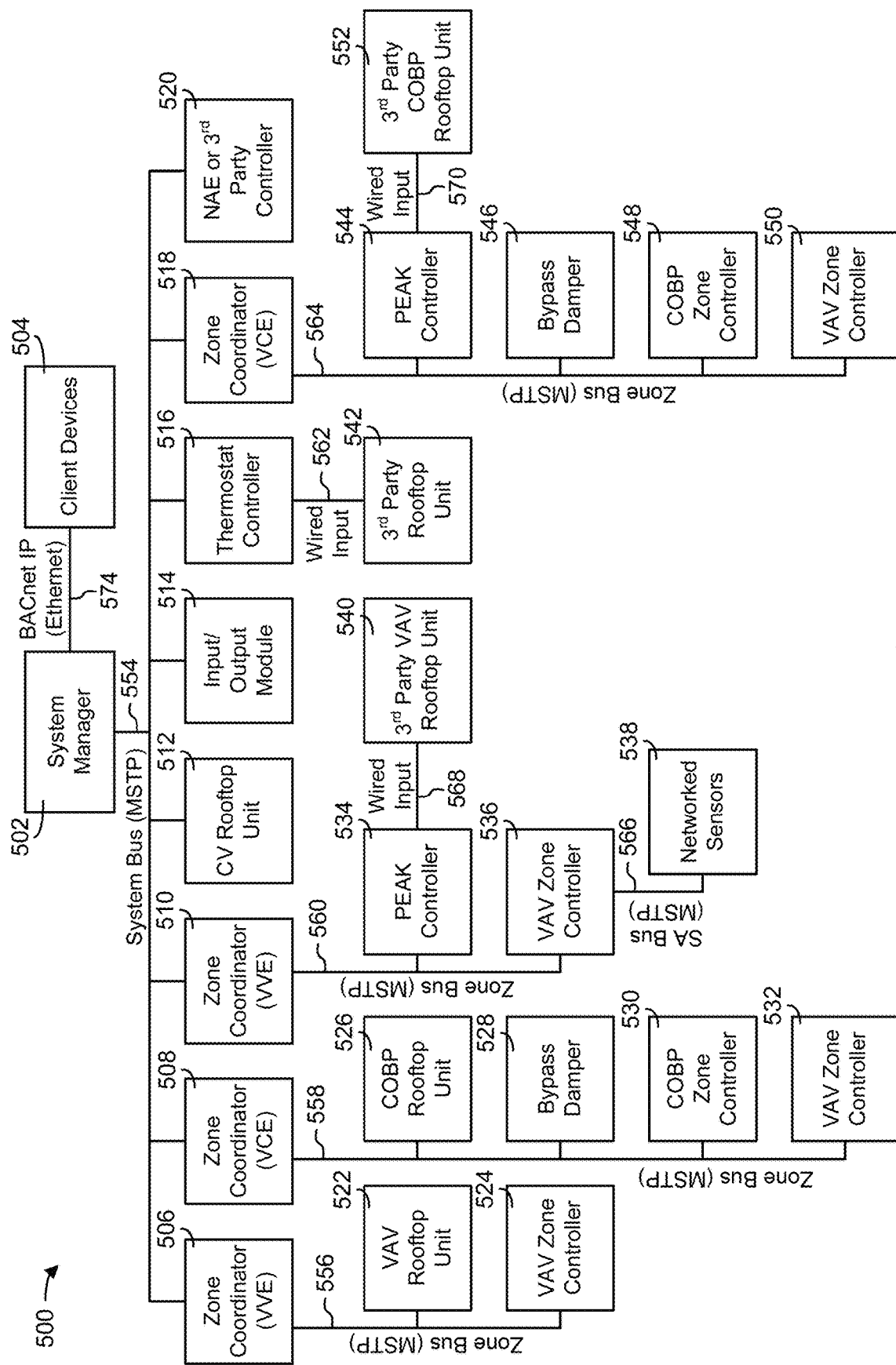
FIG. 5 is a block diagram of another building management system (BMS) that can be used to monitor and control the building and HVAC system of FIG. 1, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Fault Detection and Energy Wastage

As briefly discussed above, a BMS may be configured to monitor and/or control building equipment (e.g., any building equipment shown in FIGS. 1-5) and/or building subsystems (e.g., building subsystem 428) in order to optimize building operations, such as by reducing operating costs and energy usage, decreasing downtime, increasing occupant comfort, etc. Accordingly, equipment maintenance may be a key factor in optimizing building operations. For example, equipment that is operating in a less-than-optimal state may be less efficient than other building equipment, which may lead to higher operating costs, increase energy usage, etc. In another example, equipment that is non-operable may cause added stress on other components of the BMS as the demand on the other components is increased to meet building requirements (e.g., setpoints).

In this regard, a fault detection system, such as the system described herein, may advantageously detect equipment and/or subsystem faults, so that detected faults can be quickly remedied to reduce downtime and wasted energy while maintaining occupant comfort. In some embodiments, the fault detection system is configured to determine not only a priority of detected faults, but may also determine an amount of energy waste during a fault condition and, based on the energy wasted, a cost of the fault. Advantageously, the fault detection system may prioritize faults based on either a predefined priority or the cost associated with the fault. For example, faults that result in much larger costs may be prioritized over other, less expensive faults.

Figure 6A:
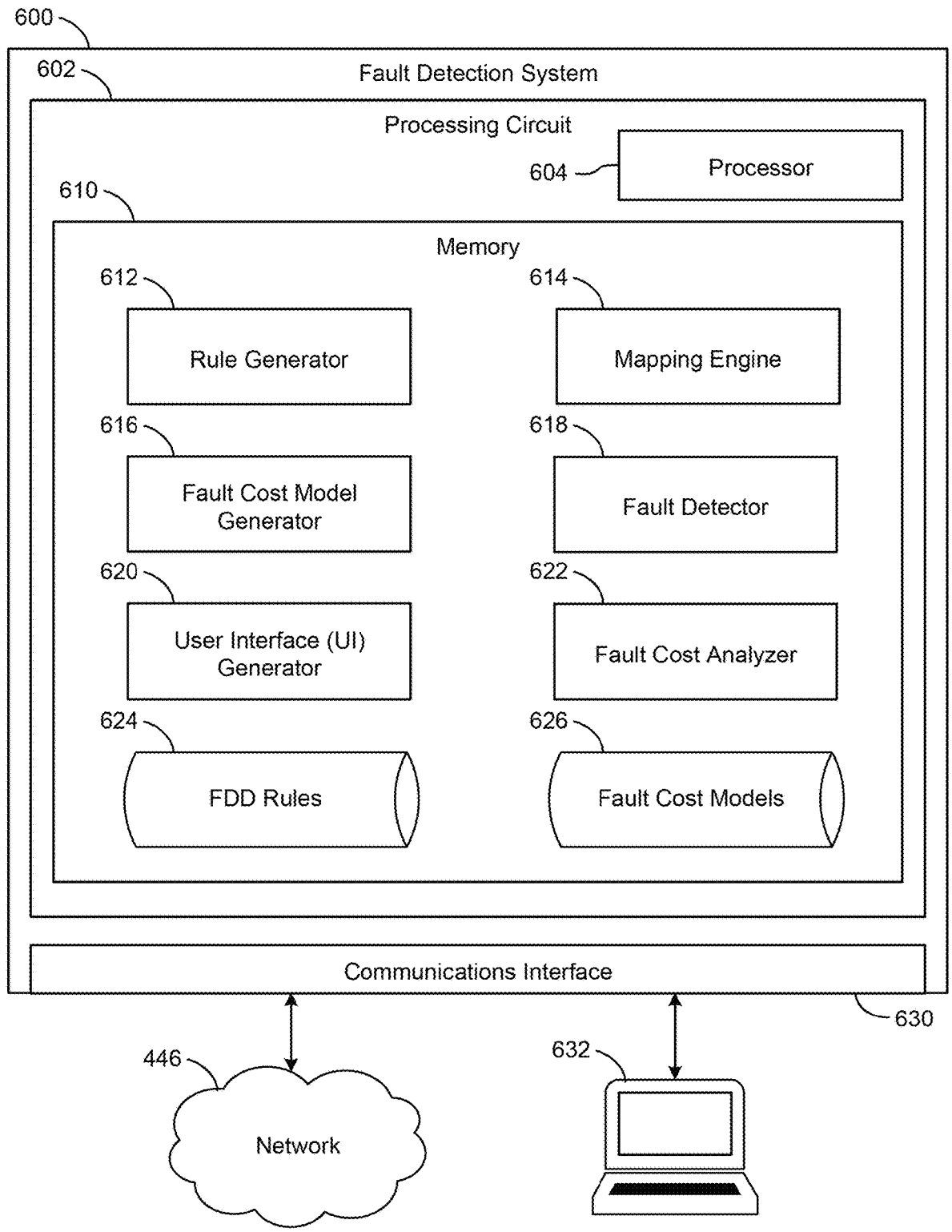
FIG. 6A is a block diagram of a fault detection system for monitoring building equipment and detecting fault conditions, according to some embodiments.
Figure 6B:
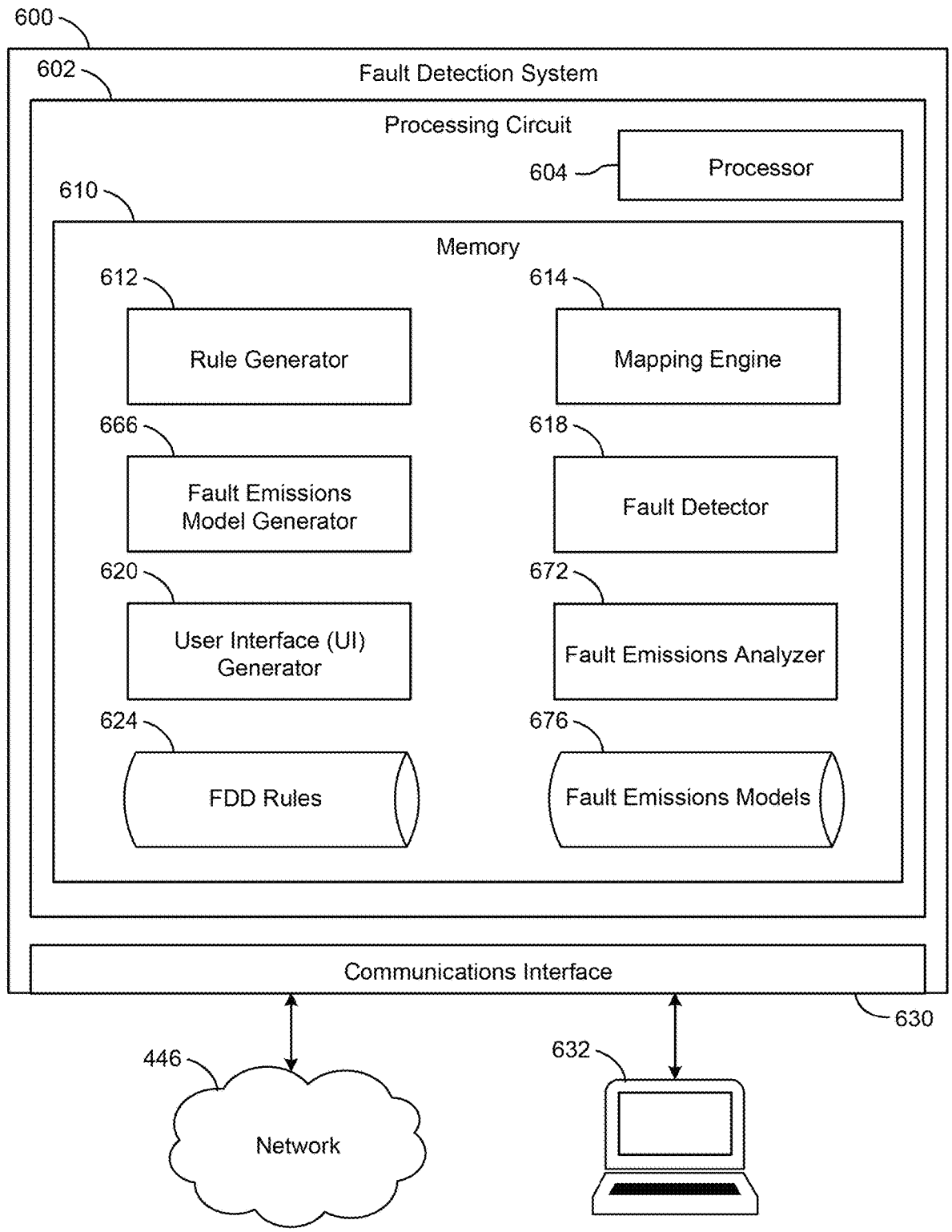
FIG. 6B is a block diagram of a fault detection system for monitoring building equipment and detecting fault conditions, according to some embodiments.

Referring now to FIGS. 6A and 6B, block diagrams of a fault detection system 600 for monitoring building equipment and detecting fault conditions are shown, according to some embodiments. As discussed above, system 600 may be configured to not only detect equipment faults, but may also respond to faults by determining energy wastage, emissions (e.g., greenhouse gas emissions, carbon emissions, pollutants, etc.), cost associated with the fault, and by initiating automated actions such as generating work orders to correct detected faults. In various embodiments, system 600 is implemented via a single computing device, such as a computer, a server, etc., or via multiple computing devices (e.g., via a distributed or cloud-based server system). In some such embodiments, the computing device that implements system 600 may be included in a BMS, such as the BMS of building 10 described above. In some embodiments, system 600 is implemented via a BMS controller, such as BMS controller 366. For example, system 600 may be a component of FDD layer 416, also described above.

System 600 is shown to include a processing circuit 602, which includes a processor 604 and a memory 610. It will be appreciated that these components can be implemented using a variety of different types and quantities of processors and memory. For example, processor 604 can be a general purpose processor, an application specific integrated circuit (ASIC), one or more field programmable gate arrays (FPGAs), a group of processing components, or other suitable electronic processing components. Processor 604 can be communicatively coupled to memory 610. While processing circuit 602 is shown as including one processor 604 and one memory 610, it should be understood that, as discussed herein, a processing circuit and/or memory may be implemented using multiple processors and/or memories in various embodiments. All such implementations are contemplated within the scope of the present disclosure.

Memory 610 can include one or more devices (e.g., memory units, memory devices, storage devices, etc.) for storing data and/or computer code for completing and/or facilitating the various processes described in the present disclosure. Memory 610 can include random access memory (RAM), read-only memory (ROM), hard drive storage, temporary storage, non-volatile memory, flash memory, optical memory, or any other suitable memory for storing software objects and/or computer instructions. Memory 610 can include database components, object code components, script components, or any other type of information structure for supporting the various activities and information structures described in the present disclosure. Memory 610 can be communicably connected to processor 604 via processing circuit 602 and can include computer code for executing (e.g., by processor 604) one or more processes described herein.

Memory 610 is shown to include a rule generator 612 configured to generate and/or modify fault detection rules. In some embodiments, a fault detection rule includes one or more parameters (e.g., conditions, criteria, threshold values, etc.) that characterize faulty operation and, if met, indicate that the fault detection rule is satisfied and thus a fault is present in the system. In some embodiments, a fault detection rule includes one or more parameters that characterize normal (i.e., non-faulty) operation and, if met, indicate that the fault detection rule is "broken" and thus a fault is present in the system. In some such embodiments, the one or more conditions or criteria can include a fault expression or equation. For example, a fault detection rule may be a Boolean expression comprising one or more operators (e.g., AND, OR, NOT, etc.) that is evaluated, based on equipment operating data, as either "true" or "false." Whether an outcome of "true" or "false" indicates a fault condition may depend on whether the fault detection rule characterizes faulty or normal operation. A fault detection rule may include other parameters such as an identifier (i.e., name) for the rule, a rule description, a category and priority of the fault, an associated type of building equipment, and any other suitable parameters. An example fault detection rule is described in greater detail below, with respect to FIG. 8.

In some embodiments, a first set of fault detection rules is predefined (e.g., prior to operating a BMS or building equipment), and the first set of fault detection rules is stored in a fault detection and diagnosis (FDD) rules database 624. The first set of fault detection rules may be predefined by a user or by a remote system, for example, and may be transmitted to system 600 for storage. In some embodiments, the first set of fault detection rules is preprogrammed or stored in FDD rules database 624 prior to initialization of system 600.

In some embodiments, rule generator 612 is configured to generate one or more additional fault detection rules as part of a second set of fault detection rules. In some such embodiments, rule generator 612 is configured to receive user inputs defining one or more parameters for a new fault detection rule. Rule generator 612 can then generate the new fault detection rule based on the user input. In some embodiments, rule generator 612 determines new fault detection rules over time, such as by analyzing equipment operating data via a neural network or other artificial intelligence system. In this regard, rule generator 612 may automatically identify and generate new fault detection rules by learning a BMS or user preferences over time.

Memory 610 is also shown to include a mapping engine 614 configured to map fault detection rules to building devices and/or systems (e.g., building subsystems 428). Mapping a fault detection rule to a building device generally includes associating the building device with the fault detection rule, or vice versa, such that operating data associated with the building device can be analyzed according to the mapped fault detection rule. In some embodiments, the fault detection rule includes a reference to the building device, or a reference to an object (e.g., a software object) in the BMS representing the building device. In some such embodiments, mapping includes generating a tag or a pointer and storing the tag or pointer in a data object associated with either the fault detection rule and/or the building device. For example, a pointer to an object representing the building device may be stored in a data structure that includes the fault detection rule. It will be appreciated that other methods of mapping fault detection rules to a building device or multiple building devices may also be utilized, and are therefore contemplated herein.

As shown in FIG. 6A, memory 610 also includes a fault cost model generator 616 configured to generate fault cost models for determining an amount of energy wasted over a time period of a fault and/or for determining a cost associated with the fault. Similar to a fault detection rule as described above, a fault cost model may include a plurality of parameters including an expression or equation defining the model. In this regard, a fault cost model may be utilized, in response to the detection of a fault, to calculate energy wastage and cost for the fault. In some embodiments, a fault cost model may include one or more variables relating to at least an amount of energy consumed by a building device, a time period of the fault, and a cost of a resource consumed by the device.

As shown in FIG. 6B, memory 610 also includes a fault emissions model generator 666 configured to generate fault emissions models for determining an amount of energy wasted over a time period of a fault and/or for determining an amount of emissions (e.g., carbon emissions, greenhouse gas emissions, etc.) associated with the fault. Similar to a fault cost rule as described above, a fault emissions model may include a plurality of parameters including an expression or equation defining the model. In this regard, a fault emissions model may be utilized, in response to the detection of a fault, to calculate the excess emissions (e.g., carbon emissions) generated due to the fault. In some embodiments, a fault emissions model may include one or more variables relating to at least an amount of energy consumed by a building device, a time period of the fault, and a rate of emissions generated by the device or otherwise attributable to the fault.

As shown in FIG. 6A, in some embodiments, fault cost model generator 616 may generate and/or modify fault cost models over time, and may store fault cost models in a fault cost model database 626. In some embodiments, fault cost model database 626 may include a first set of predefined fault cost models, such as models defined by a user and/or defined prior to initialization of system 600, and a second set of fault cost models that are generated during operations of system 600. In this regard, fault cost model generator 616 may be configured to learn system behaviors or user preferences to generate new models. In some embodiments, fault cost model generator 616 generates new fault cost models based on empirical data gathered during operation of system 600 indicating various faults and changes in resource consumption (e.g., energy consumption, water consumption, etc.) resulting from various faults. For example, fault cost model generator 616 may compare resource consumption before and after a fault is detected to determine an amount that the resource consumption changes as a result of the fault. In some embodiments, each fault cost model generated by fault cost model generator 616 may include a reference to an associated fault, or vice versa. In other embodiments, fault cost models may be generated and stored as part of a fault detection rule.

As shown in FIG. 6B, in some embodiments, fault emissions model generator 666 may generate and/or modify fault emissions models over time, and may store fault emissions models in a fault emissions model database 676. In some embodiments, fault emissions model database 676 may include a first set of predefined fault emissions models, such as models defined by a user and/or defined prior to initialization of system 600, and a second set of fault emissions models that are generated during operations of system 600.

In this regard, fault emissions model generator 666 may be configured to learn system behaviors or user preferences to generate new models. In some embodiments, fault emissions model generator 666 generates new fault cost models based on empirical data gathered during operation of system 600 indicating various faults and changes in resource consumption (e.g., energy consumption, water consumption, etc.) resulting from various faults. For example, fault emissions model generator 666 may compare resource consumption before and after a fault is detected to determine an amount that the resource consumption changes as a result of the fault. In some embodiments, each fault cost model generated by fault emissions model generator 666 may include a reference to an associated fault, or vice versa. In other embodiments, fault emissions models may be generated and stored as part of a fault detection rule.

Memory 610 also includes a fault detector 618 configured to analyze building equipment operating data to detect faults. In particular, fault detector 618 may be configured to obtain operating data from a plurality of building devices or subsystems, either by receiving the operating data or by requesting/retrieving the operating data. In some embodiments, operating data is received or retrieved at a regular time interval, such as very second, every minute, every hour, etc. Fault detector 618 may be configured to analyze any newly obtained operating data at each time interval, thereby checking each building device or subsystem for faults at each time interval. In some such embodiments, a time interval for obtaining operating data and subsequently analyzing the data for faults is determined based on a user input. In other embodiments, the time interval is defined or predetermined. For example, the time interval may be set based on a processing speed of processor 604 or based on a rate at which building devices poll and transmit relevant operating data.

In some embodiments, fault detector 618 detects faults by comparing and analyzing the operating data with respect to the one or more fault detection rules stored in FDD rules database 624. In some such embodiments, fault detector 618 can identifying a building device or building device type associated with the operating data (e.g., based on metadata included in the operating data), and can retrieve and/or analyze the operating data with respect to an appropriate fault detection rule. Analyze a fault detection rule may include determining whether an expression or equation associated with the fault detection rule is true or false based on the operating data. For example, a fault detection rule for a chiller may be deemed "true" if a chilled water output temperature is below a predefined value (e.g., a threshold). If this fault detection rule is "true," the rule may be considered satisfied, and fault detector 618 may flag the associated building device as experiencing a fault.

In some embodiments, fault detector 618 is also configured to record (i.e., store) additional data regarding a fault, once the fault is detected. For example, fault detector 618 may be configured to record a date and a time that the fault was detected. Likewise, fault detector 618 may also record a date and time that the fault was corrected. In some embodiments, fault detector 618 is configured to estimate a time period for the fault (i.e., an amount of time that the device is likely to experience the fault condition). In some such embodiments, fault detector 618 can be configured to learn, over time, the average time interval between the detection of a fault and the resolution of the fault for each building device or particular fault. Thus, fault detector 618 can estimate the amount of time that it will take to resolve the fault based on historical data. Additionally, fault detector 618 may be configured to update an estimated time to resolution for each fault, as detected faults are resolved.

Still referring to FIGS. 6A and 6B, memory 610 further includes a user interface (UI) generator 620. UI generator 620 may be configured to generate graphical interfaces for presenting BPI related information. For example, UI generator 620 may generate interfaces that present graphs, charts, animations, etc. that indicate a BPI value for a BMS. In some embodiments, UI generator 620 may also generate and present interfaces that indicate BMS inefficiencies. For example, an interface may be generated that indicates specific BMS components (e.g., controllers, devices, sensors, etc.) that caused a non-zero penalty score during the calculation of the BPI. The various user interfaces generated by UI generator 620 are described in greater detail below, with respect to FIGS. 8-10.

The various user interfaces generated by UI generator 620 may be presented via user device 632. User device 632 may be any device having an interface for presenting data to a user. For example, user device 632 may include at least a screen for presenting interfaces, and an input device for receiving user inputs. In some embodiments, user device 632 is a desktop or laptop computer, a smartphone, a tablet, a smart watch, etc. User device 632 may be communicably coupled to system 600 via a communications interface 630, which also provides an interface for system 600 to transmit and receive data via network 446.

Referring again to FIG. 6A, memory 610 also includes a fault cost analyzer 622 configured to determine the amount of energy wasted and the cost of a fault based on one or more fault cost models (e.g., stored in fault cost model database 626). In this regard, fault cost analyzer 622 may be configured to (e.g., in response to an indication from fault detector 618) retrieve a fault cost model (e.g., from fault cost model database 626) associated with a detected fault. Fault cost analyzer 622 may determine, individually or based on an indication from fault detector 618, a time period of the fault and an amount of energy consumed by the faulty device over the duration of the fault period. In some embodiments, an amount of energy consumed by the device during a fault condition is variable based on the type of fault. For example, certain types of faults may cause the device to consume more or less energy than normal. In some embodiments, an amount of energy consumed by the device during a fault condition is fixed or is known, based on the type of fault. For example, it may be known that a certain type of fault will most likely cause the device to consume a set amount of energy or increase energy consumption by a set amount.

In some embodiments, fault cost analyzer 622 also accounts for the energy consumption of other, related building devices, which may impact the total amount of energy consumed by a building or system. For example, in a building including three chillers, a fault in a first chiller that reduces the output of the first chiller may cause the two remaining chillers to increase an output to maintain building comfort settings (e.g., setpoints), thereby increasing the energy usage of the two remaining chillers. Accordingly, fault cost analyzer 622 may determine the total excess energy usage (i.e., energy wastage) across all building devices in response to a fault.

In some embodiments, fault cost analyzer 622 is configured to calculate a cost associated with the fault based on the length of time that the building device was experiencing the fault, the determined energy wastage due to the fault, and current rates or costs for obtaining a related energy resource, such as electricity, natural gas, etc. In such embodiments, fault cost analyzer 622 may obtain current rate data from a resource supplier (e.g., a power company, a natural gas provider, etc.), such as via network 446. For example, fault cost analyzer 622 may retrieve rate data from a website or server of the resource supplier. In this regard, resource purchasing rates may fluctuate over time (e.g., based on demand), thus fault cost analyzer 622 may provide a more accurate cost for the fault by retrieving current rates. However, in other embodiments, fault cost analyzer 622 utilizes a fixed resource cost or updates resource costs at a regular interval (e.g., not in response to performing a fault cost calculation).

Although the cost calculations (e.g., the fault cost model) described herein are described primarily as accounting for monetary cost, it is contemplated that the cost calculations could be modified or replaced with any type of cost function that accounts for one or more other control objectives (e.g., resource consumption, carbon emissions, occupant comfort, disease transmission risk, equipment degradation or reliability, etc.) in addition to monetary cost or in place of monetary cost without departing from the teachings of the present disclosure. It should be understood that the "cost" calculated in the cost calculations may be a monetary cost (e.g., expressed in units of dollars or other currency) and/or other types of cost such as resource consumption (e.g., expressed in units of energy, water, natural gas, or any other resource), carbon emissions (e.g., expressed in units of carbon), occupant comfort (e.g., expressed in units of comfort), disease transmission risk (e.g., expressed in units of risk or probability), and/or equipment reliability (e.g., expressed in units of reliability or expected failures). As such, it should be appreciated that references to "cost" throughout the present disclosure are not necessarily monetary cost, but may include any other control objectives which may be desirable to optimize.

Referring again to FIG. 6B, memory 610 also includes a fault emissions analyzer 672 configured to determine the amount of additional emissions generated by a fault based on one or more fault emissions models (e.g., stored in fault cost model database 626). In this regard, fault emissions analyzer 672 may be configured to (e.g., in response to an indication from fault detector 618) retrieve a fault emissions model (e.g., from fault emissions model database 676) associated with a detected fault. Fault emissions analyzer 672 may determine, individually or based on an indication from fault detector 618, a time period of the fault and an amount of additional emissions generated by the faulty device over the duration of the fault period. In some embodiments, an amount of additional emissions generated by the device during a fault condition is variable based on the type of fault. For example, certain types of faults may cause the device to generate more or less emissions than normal. In some embodiments, an amount of energy consumed by the device during a fault condition is fixed or is known, based on the type of fault. For example, it may be known that a certain type of fault will most likely cause the device to consume a set amount of energy, increase energy consumption, or generate increased emissions by a set amount.

In some embodiments, fault emissions analyzer 672 also accounts for the energy consumption of other, related building devices, which may impact the total amount of emissions generated by a building or system. For example, in a building including three chillers, a fault in a first chiller that reduces the emissions generated by the first chiller may cause the two remaining chillers to increase in power output to maintain building comfort settings (e.g., setpoints), thereby increasing the amount of emissions generated by the two remaining chillers. Accordingly, fault emissions analyzer 672 may determine the total excess energy usage (i.e., energy wastage) across all building devices in response to a fault.

In some embodiments, fault emissions analyzer 672 is configured to calculate an amount of emissions generated due to the fault based on the length of time that the building device was experiencing the fault and the determined energy wastage due to the fault. In such embodiments, fault emissions analyzer 672 may obtain energy mix data from a resource supplier (e.g., a power company, a natural gas provider, etc.), such as via network 446. The energy mix data may include the percentage of renewable energy used by the resource supplier and/or the types of fossil fuels used to generate power. For example, fault emissions analyzer 672 may retrieve energy mix data from a website or server of the resource supplier. In this regard, resource the energy mix used by the resource supplier may fluctuate over time (e.g., based on demand), thus fault emissions analyzer 672 may provide a more accurate calculation of the emissions generated due to the fault by retrieving current rates. However, in other embodiments, fault emissions analyzer 672 utilizes a fixed emissions rate or retrieves the energy mix data at a regular interval (e.g., not in response to performing a fault emissions calculation).

In some embodiments, in response to a detected fault and/or in response a determination of the energy wasted, emissions generated, or cost of the fault, system 600 (e.g., in particular, fault detector 618, fault emissions analyzer 672, and/or fault cost analyzer 622) may be configured to initiate automated responses. Automated responses may include, for example, generating a work order for the detected fault and automatically scheduling a visit from a technician to correct the fault. In some embodiments, system 600 generates a work order itself or transmits a request to generate a work order to a remote work order management system. In any case, the work order may indicate a type of fault, a device and location of the device experiencing the fault, a time and date that the fault was detected, and any other relevant fault information that may aid a technician in diagnosing and correcting the fault.

In some embodiments, the automated response includes generating and transmitting (e.g., to a user device), an alert identifying the fault and indicating the cost associated with and/or emissions generated by the fault. For example, system 600 may send the alert via a text message, an email, a voice call, a push notification, or by any other method to user device 632. In some embodiments, the automated response includes generating, by UI generator 620, a user interface that displays information identifying the fault and the affected device, and presenting the energy and cost information calculated by fault cost analyzer 622 and/or the emissions information calculated by the fault emissions analyzer 672. For example, a user interface can be presented via user device 632 that includes graphs, text, images, and other elements for presenting fault information.

Figure 7A:
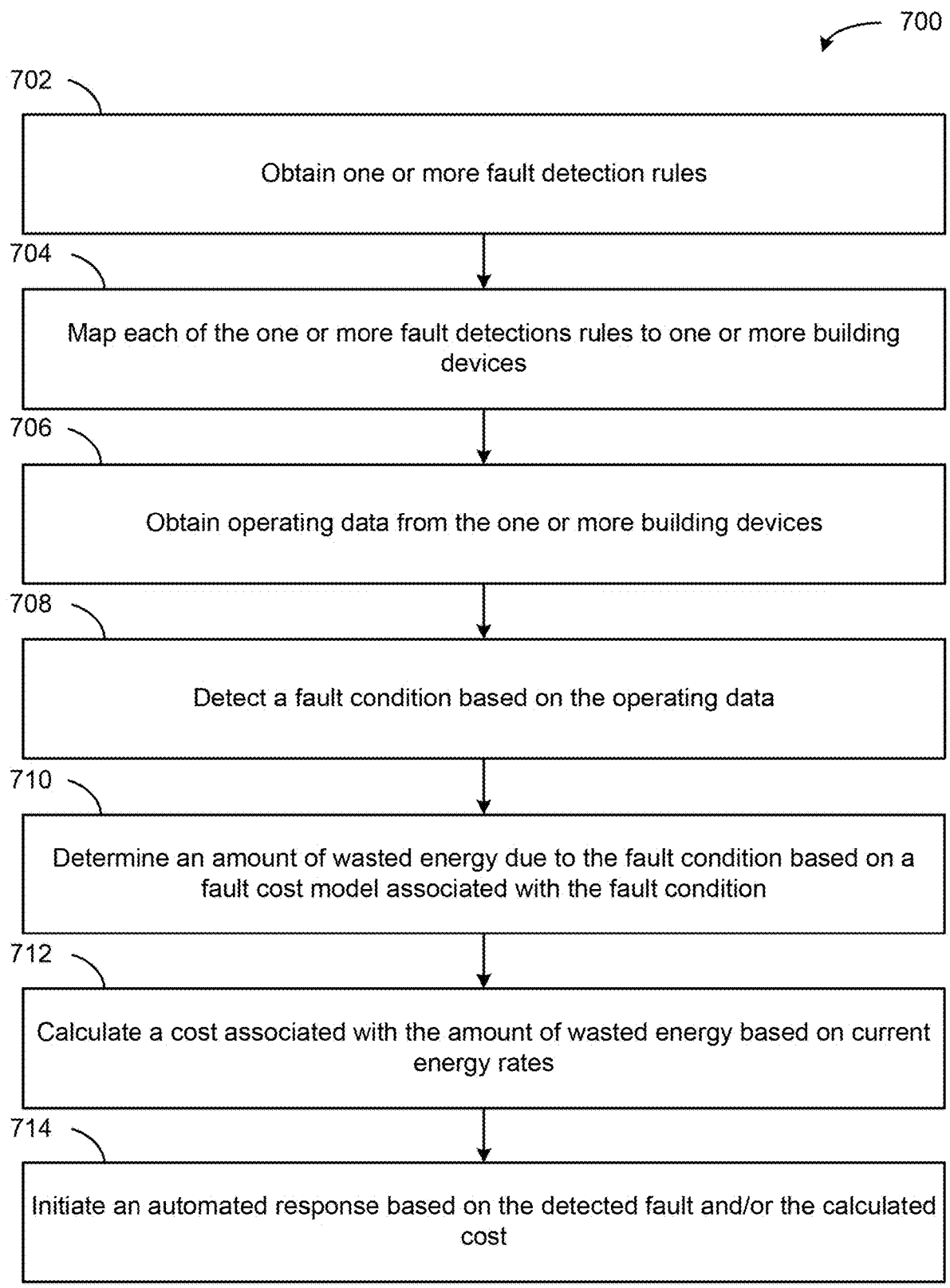
FIG. 7A is a method for determining a cost associated with a fault, according to some embodiments.

Referring now to FIG. 7A, a method 700 for determining a cost associated with a fault is shown, according to some embodiments. FIG. 7C is a chart illustrating the data flow that takes place in method 700. Method 700 may be implemented by system 600, for example, in order to detect equipment faults, determine a cost associated with the fault, and initiate automated responses based on the fault. Advantageously, determining an amount of wasted energy and a cost associated with a fault may not only provide more complete insights to a user (e.g., a building manager) but may also allow for the prioritization of high-cost fault conditions. In this regard, high-cost faults or faults that waste large amounts of energy may be attended to more quickly than other, less expensive faults, thereby minimizing excess costs due to faults. It will be appreciated that certain steps of method 700 may be optional and, in some embodiments, method 700 may be implemented using fewer than all of the steps.

At step 702, one or more fault detection rules are obtained. In some embodiments, the one or more fault detection rules are predefined and stored in a database for retrieval. In some embodiments, at least a portion of the one or more fault detection rules are user defined. In such embodiments, a user (e.g., a building manager) may input parameters for the one or more fault detection rules via a user interface, and a fault detection rule can be generated based on the user's inputs. In any case, obtaining the one or more fault detection rules may include retrieving the one or more fault detection rules from a database and/or receiving a user input defining a new fault detection rule. In some embodiments, a first set of fault detection rules may be predefined and a second set of fault detection rules may be defined by a user during operations of system 600.

At step 704, each of the one or more fault detection rules are mapped to one or more building devices. As described above, mapping a fault detection rule to a building device generally includes associating the building device with the fault detection rule, or vice versa, such that operating data associated with the building device can be analyzed according to the mapped fault detection rule. In some embodiments, the fault detection rule includes a reference to the building device, or a reference to an object (e.g., a software object) in the BMS representing the building device. In some such embodiments, mapping includes generating a tag or a pointer and storing the tag or pointer in a data object associated with either the fault detection rule and/or the building device. For example, a pointer to an object representing the building device may be stored in a data structure that includes the fault detection rule. It will be appreciated that other methods of mapping fault detection rules to a building device or multiple building devices may also be utilized, and are therefore contemplated herein.

In some embodiments, a fault detection rule may be mapped to a virtual data point or virtual meter, for example, within a digital twin. A digital twin can be a virtual representation of a building and/or an entity of the building (e.g., space, piece of equipment, occupant, etc.). Furthermore, the digital twin can represent a service performed in a building, e.g., facility management, clean air optimization, energy prediction, equipment maintenance, etc. Digital twins are further described in U.S. patent application Ser. No. 17/537, 046, filed Nov. 29, 2021, the entire content of which is incorporated by reference herein. A digital twin may include virtual data points or virtual meters that correspond to physical parameters not directly measured by physical meters. A virtual data point may be defined as a function of real data points. For example, a virtual enthalpy point that represents the enthalpy of a fluid can be calculated based on real points that represent the temperature and pressure of the fluid. Virtual data points are further described in U.S. Pat. No. 10,649,419 (application. Ser. No. 15/182,580), filed Jun. 14, 2016 and U.S. Pat. No. 11,281,169 (application. Ser. No. 16/052,083), filed Aug. 1, 2018, the entire contents of which are incorporated by reference herein.

At step 706, operating data is obtained from each of the one or more building devices and/or virtual data points. In some embodiments, operating data is requested and/or retrieved from the one or more building devices, such as by querying the building devices or building device controllers. In some embodiments, operating data is received from the one or more building devices automatically. In any case, operating data may be obtained at a regular or irregular time interval (e.g., multiple times per second, every minute, every day, every month, intermittently, on demand, etc.). For example, system 600 may request operating data from each building device at the regular time interval, and/or the one or more building devices may transmit operating data at the regular time interval. Advantageously, operating data for each building device may be obtained at the same time interval, to prevent a mismatch of data or to prevent data from being received at different times, from different devices.

In some embodiments, the regular time interval is predefined. For example, the time interval may be set based on a processing speed of system 600. However, in other embodiments, the time interval for obtaining operating data is defined by a user. For example, a building manager may choose to obtain operating data every 30 seconds, in turn performing a fault check for each building device every 30 seconds.

At step 708, a fault condition is detected based on the operating data. In some embodiments, the operating data is compared to, or analyzed based on, the one or more fault detection rules. In such embodiments, a set of operating data may indicate the associated building device that transmitted and/or collected the operating data, which can then be used to determine one or more fault detection rules associated with the device. The fault detection rules may then be evaluated based on the operating data to determine if any of the fault detection rules are satisfied (e.g., evaluated as "true"). For example, a value of a particular parameter for the building device may be compared to a fault detection rule to determine if the requirements for the fault detection rule are met. If the fault detection rule is determined to be true, then the rule may be considered satisfied, indicating a fault.

In some embodiments, step 708 can include modifying one of the fault detection rule or the operating data prior to analyzing the fault detection rule. In such embodiments, the fault detection rule and/or operating data may be modified based on a format or a unit of measurement of the operating data and/or based on a preferred unit of measurement for display (e.g., a user defined unit of measurement). For example, a first chiller may measure water temperatures in Celsius while a second chiller may measure water temperatures in Fahrenheit. Accordingly, the operating data and/or a fault detection rule that applies to chillers may be modified to accommodate for the different units of measurement. For example, the fault detection rule may be automatically modified for Celsius and Fahrenheit, or a second fault detection rule may be automatically generated based on one of the units of measurement. Alternatively, the operating data may be converted to a unit of measurement defined by the fault detection rule.

At step 710, an amount of energy wasted over a time period of the fault condition is determined based on a fault cost model associated with the fault condition. For example, a building device may be determined to waste 10 kWh of electricity over the course of the fault. Like the one or more fault detection rules, one or more fault cost models may be generated and/or predefined and stored in a fault cost model database. In this regard, a fault cost model associated with the detected fault may be retrieved responsive to detecting the fault and based on the identity of the particular fault detected. For example, the fault cost model database may store many different fault cost models, each of which corresponds to a particular fault. Upon detecting a fault in step 708, one or more attributes characterizing the fault (e.g., fault ID, type of fault, device in which the fault occurs, ID of the particular fault detection rule triggered, etc.) may be used to identify and retrieve a corresponding fault cost model in step 710. As described above, a fault cost model may include a plurality of parameters including an expression or equation defining the model. For example, a fault cost model may include an expression or an equation that includes one or more variables relating to at least an amount of energy consumed by a building device, a time period of the fault, and a cost of a resource consumed by the device.

In some embodiments, a fault cost model is modified based on a format or a unit of measurement of the operating data and/or based on a preferred unit of measurement for display (e.g., a user defined unit of measurement). In some such embodiments, the fault cost model is modified such that each term of the model is defined by a common unit of measurement, rather than modifying a fault detection rule or the received operating data (e.g., at step 708). In some embodiments, a fault cost model (e.g., and/or the fault cost model generator 616) is configured to automatically detect units of measurements, such as based on the input operating data, to adjust the fault cost model itself, or an output of the fault cost model. For example, operating data in various different formats or units of measurement may be input to the fault cost model, and the fault cost model may be configured to automatically convert the disparate data into a common format, and output a result in the common format.

In some embodiments, step 710 also includes determining the time period (i.e., duration) of the fault condition, and/or estimating the amount of time that the building device will experience the fault. For example, the fault cost model may be analyzed for a period of time between the detection of the fault and a present time, to determine an amount of energy wasted up to a current moment (e.g., in real-time). Alternatively, the fault cost model may be analyzed over the estimated period of time that extends into the future, to estimate the amount of wasted energy. In some embodiments, the estimated period of time for a fault may be determined based on historical data, or based on a determination of when a technician can reach the device for service. In some embodiments, building device data, as well as data from virtual meters or virtual data points may be used, for example, in a digital twin, to determine trends and predict future faults. A predicted amount of energy wasted, cost and duration of the fault can be determined based on trends from previous data readings. For example, a fault may be predicted based on a data point reporting data readings that are continuously increasing toward a level indicating a fault. By predicting a fault before it occurs, preventative maintenance can be performed to prevent the fault and reduce or eliminate the potential costs or emissions that would have been generated. Some faults or types of faults may be temporary faults that typically resolve themselves without the need for corrective action. In some embodiments, the amount of time that the building device will experience the fault is estimated based on a history of past faults and corresponding time periods during which the faults persisted before resolving themselves. Other faults or types of faults may be permanent faults that typically do not resolve themselves unless corrective action is taken. In some embodiments, the amount of time that the building device will experience the fault is estimated based on how soon a service technician can correct the fault. For example, system 600 may determine a work order schedule and/or a technician's schedule to determine the earliest time that the technician can correct the fault. In yet another example, the fault cost model may be analyzed for a period of time between the detection of the fault and a time when the fault is corrected or the device is turned off.

In some embodiments, the amount of energy wasted over a time period of the fault condition is determined at a regular time interval, such as based on the rate at which operating data is received. For example, the fault cost model may be used to determine energy wastage at each time step where new operating data is received from a building device. In some embodiments, the rate at which the fault cost model is used to determine the equipment energy waste is dynamically adjusted to match the rate at which data is received, or to account for missing data points. For example, if a single data point required for the determination of energy wastage is not available (e.g., the value was not captured, the corresponding device or sensors reads at a different rate than the other sensors, etc.), then the energy wastage may not be calculated for that time step. For example, if data from a single data point required for the determination of energy wasted is not available (e.g., the value was not captured, the corresponding device or sensors reads at a different rate than the other sensors, etc.), then the energy wastage may not be calculated for that time step. In other embodiments, the BMS may automatically add or correct data based on data point type when data from a data point is not available. For example, the BMS may use historical data to estimate missing or suspected erroneous data (e.g., the most recent measurement, the average measurement over a predetermined period of time, interpolated data based on a previous measurement and a subsequent measurement etc.). Methods for detecting and cleansing suspected erroneous data, which can be similarly applied to calculate missing data, are further described in points are further described in U.S. Pat. No. 9,354,968 (application. Ser. No. 13/631,301), filed Sep. 28, 2012 the entire content of which is incorporated by reference herein.

At step 712, a cost of the fault is calculated based on the amount of energy wasted. As described above, the cost of the fault may be calculated based on the fault cost model and/or based on an output of the fault cost model. In some embodiments, calculating the cost of fault includes determining a cost for the resource consumed by the device (e.g., electricity, water, gas, etc.) and multiplying the cost of the resource by the amount of energy wasted. In some embodiments, a fault cost may be calculated at one or more individual time steps, such as based on a rate for the consumed resource that changes over time, and the individual time steps may be aggregated to determine the fault cost.

In some embodiments, step 712 includes obtaining current or recent resource costs prior to calculating the fault cost. For example, resource rates may be obtained by accessing a website, server, cloud-hosted database, or other data source for a resource provider (e.g., a power company), or the resource rates may be received at a regular interval from the resource provider. In this example, the resource provider may regularly publish or update resource rates (i.e., cost) which are then pushed to customers (e.g., system 600). Accordingly, the most current resource rates and/or other known resource rates may be utilized when calculating the fault cost, to provide a more accurate fault cost.

At step 714, an automated response is initiated based on the detection of the fault and/or the calculated fault cost. As discussed above, automated responses may include generating a work order for the detected fault and automatically scheduling a visit from a technician to correct the fault. A work order may indicate a type of fault, a device and location of the device experiencing the fault, a time and date that the fault was detected, and any other relevant fault information that may aid a technician in diagnosing and correcting the fault. The automated response may also include a prioritization of multiple work orders based on the relative cost of each fault. In some embodiments, generating the work order may also include automatically scheduling a service call or a technician visit. For example, a work order log or a technician schedule may be referenced to identify and reserve a period of time that the technician can correct the fault. In some embodiments, a notification that a work order has been created may also be transmitted to a device associated with the assigned technician.

In some embodiments, the automated response includes generating and transmitting (e.g., to a user device), an alert identifying the fault and indicating the cost associated with the fault. For example, a notification may be sent via a text message, an email, a voice call, a push notification, or by any other method to user device (e.g., associated with a technician or building manager). In some embodiments, the automated response includes generating one or more user interfaces that display information identifying the fault and the affected device, and presenting the energy and cost information calculated at steps 710 and 712. For example, a user interface can be presented via user device 632 that include graphs, text, images, and other elements for presenting fault information. Additional user interfaces are described in greater detail below.

FIG. 7C is a flow chart 750 further illustrating the method 700. The fault detection rule 752 is created and repeatedly run, for example, at regular intervals as described above. The fault duration 754 is based on how long the fault detection rule 752 continues to identify an active fault. A fault cost equation 756 receives the fault detection rule, the fault duration, and information about the equipment (e.g., the equipment specifications 758, data points 760 from sensors and other feedback mechanisms, and constants 762 relating to the equipment). The fault cost equation 756 identifies the amount of each type of energy wasted 764 (e.g., electrical, thermal, etc.). The utility rates 766 are received by the resource provider and used to calculate the cost 768 of the energy wasted.

Figure 7B:
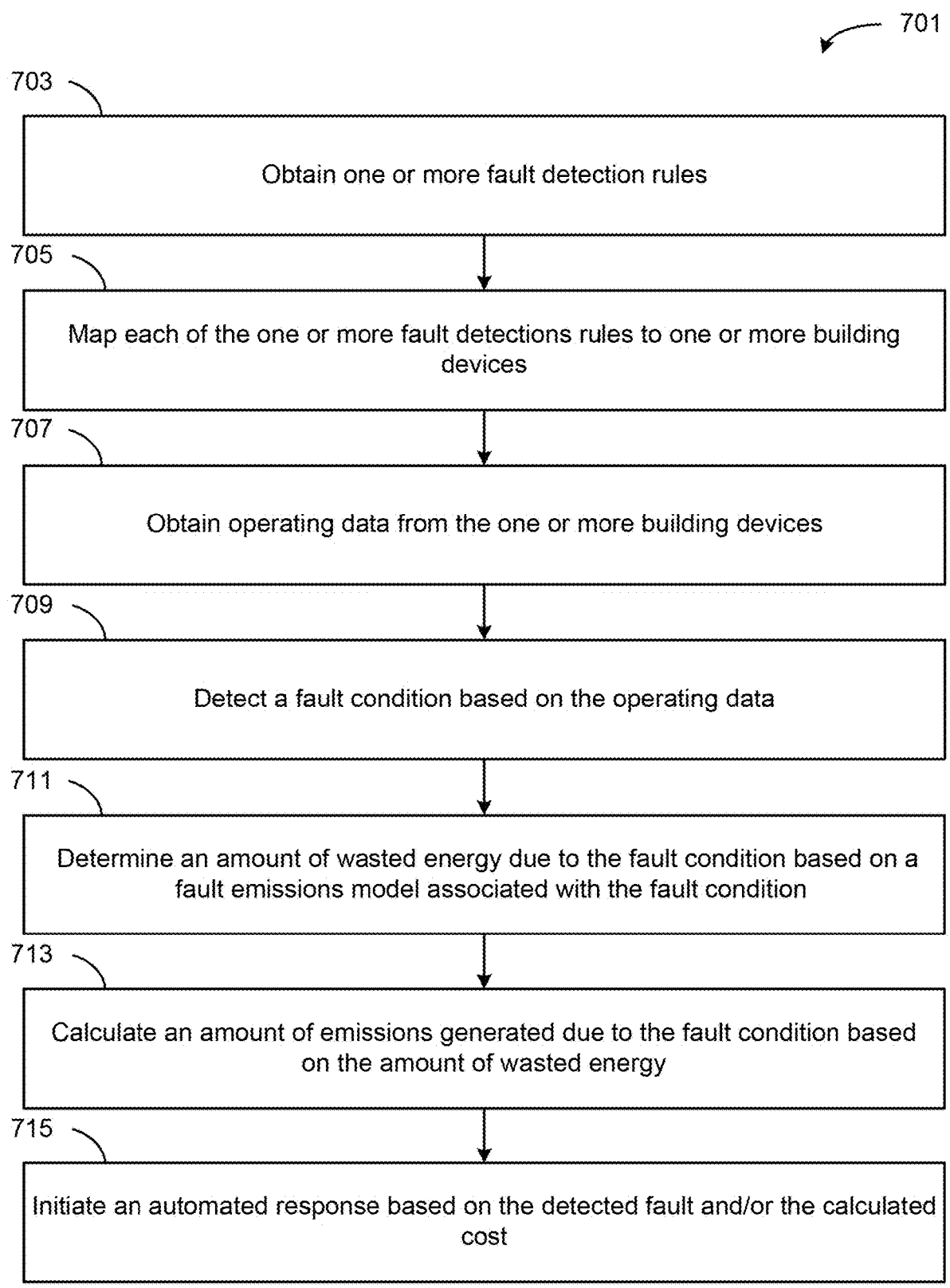
FIG. 7B is a method for determining an amount of emissions generated due to a fault, according to some embodiments.
Figure 7C:
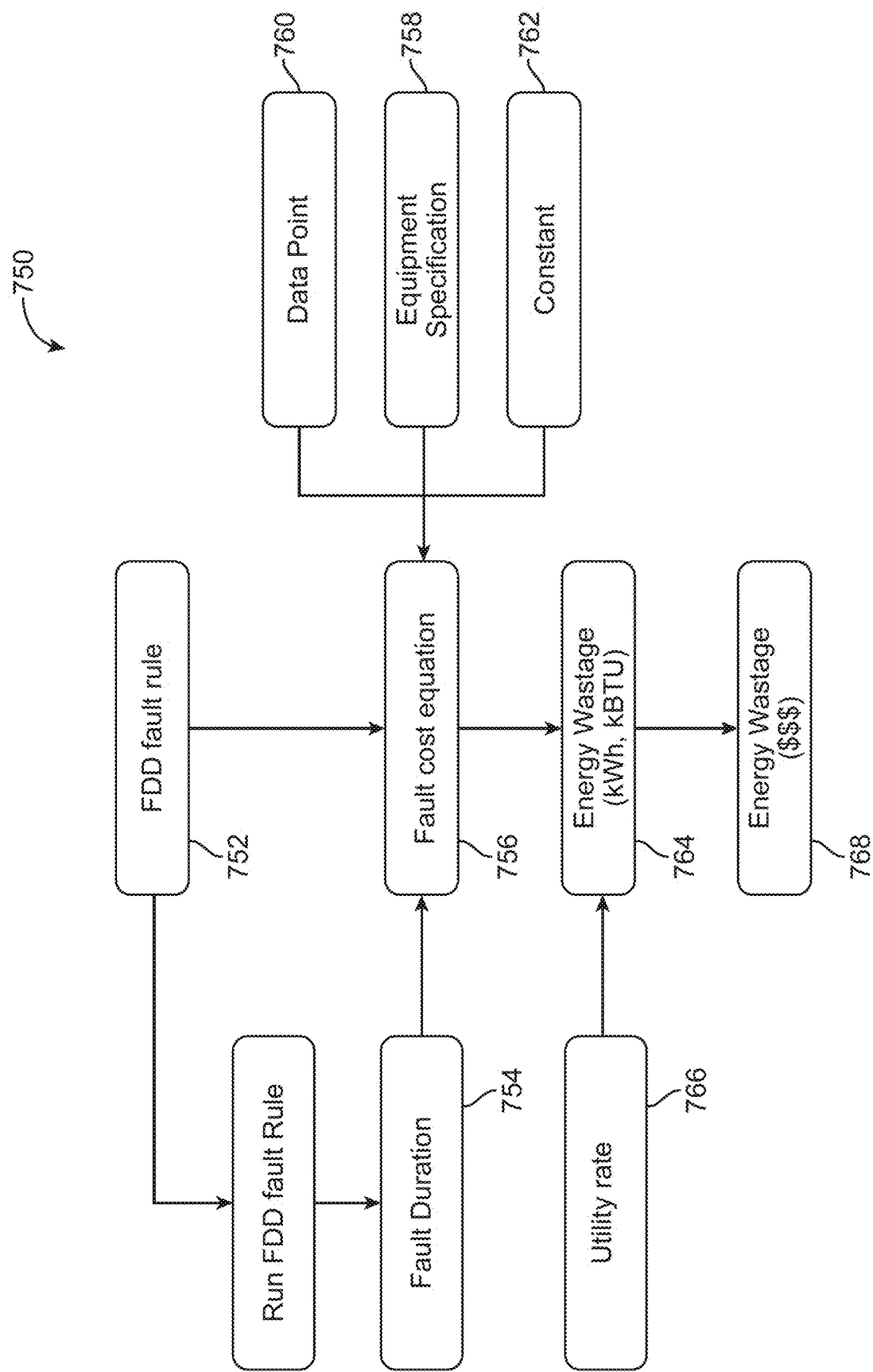
FIG. 7C is a chart illustrating the data flow that takes place in method of FIG. 7A.

Referring now to FIG. 7B, a method 701 for determining an amount of emissions generated due to a fault is shown, according to some embodiments. Method 701 may be implemented by system 600, for example, in order to detect equipment faults, determine a cost associated with the fault, and initiate automated responses based on the fault. Advantageously, determining an amount of emissions generated due to a fault may not only provide more complete insights to a user (e.g., a building manager) but may also allow for the prioritization of high-emission fault conditions. In this regard, high-emission faults may be attended to more quickly than other, lower-emission faults, thereby minimizing excess emissions due to faults. It will be appreciated that certain steps of method 701 may be optional and, in some embodiments, method 701 may be implemented using fewer than all of the steps.

At step 703, one or more fault detection rules are obtained. In some embodiments, the one or more fault detection rules are predefined and stored in a database for retrieval. In some embodiments, at least a portion of the one or more fault detection rules are user defined. In such embodiments, a user (e.g., a building manager) may input parameters for the one or more fault detection rules via a user interface, and a fault detection rule can be generated based on the user's inputs. In any case, obtaining the one or more fault detection rules may include retrieving the one or more fault detection rules from a database and/or receiving a user input defining a new fault detection rule. In some embodiments, a first set of fault detection rules may be predefined and a second set of fault detection rules may be defined by a user during operations of system 600.

At step 705, each of the one or more fault detections rules are mapped to one or more building devices. As described above, mapping a fault detection rule to a building device generally includes associating the building device with the fault detection rule, or vice versa, such that operating data associated with the building device can be analyzed according to the mapped fault detection rule. In some embodiments, the fault detection rule includes a reference to the building device, or a reference to an object (e.g., a software object) in the BMS representing the building device. In some such embodiments, mapping includes generating a tag or a pointer and storing the tag or pointer in a data object associated with either the fault detection rule and/or the building device. For example, a pointer to an object representing the building device may be stored in a data structure that includes the fault detection rule. It will be appreciated that other methods of mapping fault detection rules to a building device or multiple building devices may also be utilized, and are therefore contemplated herein.

As described above with reference to step 704 of method 700, a fault detection rule may be mapped to a virtual data point or virtual meter, for example, within a digital twin.

At step 707, operating data is obtained from each of the one or more building devices and/or virtual data points. In some embodiments, operating data is requested and/or retrieved from the one or more building devices, such as by querying the building devices or building device controllers. In some embodiments, operating data is received from the one or more building devices automatically. In any case, operating data may be obtained at a regular or irregular time interval (e.g., multiple times per second, every minute, every day, every month, intermittently, on demand, etc.). For example, system 600 may request operating data from each building device at the regular time interval, and/or the one or more building devices may transmit operating data at the regular time interval. Advantageously, operating data for each building device may be obtained at the same time interval, to prevent a mismatch of data or to prevent data from being received at different times, from different devices.

In some embodiments, the regular time interval is predefined. For example, the time interval may be set based on a processing speed of system 600. However, in other embodiments, the time interval for obtaining operating data is defined by a user. For example, a building manager may choose to obtain operating data every 30 seconds, in turn performing a fault check for each building device every 30 seconds.

At step 709, a fault condition is detected based on the operating data. In some embodiments, the operating data is compared to, or analyzed based on, the one or more fault detection rules. In such embodiments, a set of operating data may indicate the associated building device that transmitted and/or collected the operating data, which can then be used to determine one or more fault detection rules associated with the device. The fault detection rules may then be evaluated based on the operating data to determine if any of the fault detection rules are satisfied (e.g., evaluated as "true"). For example, a value of a particular parameter for the building device may be compared to a fault detection rule to determine if the requirements for the fault detection rule are met. If the fault detection rule is determined to be true, then the rule may be considered satisfied, indicating a fault.

In some embodiments, step 709 can include modifying one of the fault detection rule or the operating data prior to analyzing the fault detection rule. In such embodiments, the fault detection rule and/or operating data may be modified based on a format or a unit of measurement of the operating data and/or based on a preferred unit of measurement for display (e.g., a user defined unit of measurement). For example, a first chiller may measure water temperatures in Celsius while a second chiller may measure water temperatures in Fahrenheit. Accordingly, the operating data and/or a fault detection rule that applies to chillers may be modified to accommodate for the different units of measurement. For example, the fault detection rule may be automatically modified for Celsius and Fahrenheit, or a second fault detection rule may be automatically generated based on one of the units of measurement. Alternatively, the operating data may be converted to a unit of measurement defined by the fault detection rule.

At step 711, an amount of energy wasted over a time period of the fault condition is determined based on a fault emissions model associated with the fault condition. For example, a building device may be determined to waste 10 kWh of electricity over the course of the fault and burn an additional 10 cubic feet of natural gas due to the fault. Like the one or more fault cost models, one or more fault emissions models may be generated and/or predefined and stored in a fault emissions model database. In this regard, a fault emissions model associated with the detected fault may be retrieved responsive to detecting the fault and based on the identity of the particular fault detected. For example, the fault emissions model database may store many different fault emissions models, each of which corresponds to a particular fault. Upon detecting a fault in step 709, one or more attributes characterizing the fault (e.g., fault ID, type of fault, device in which the fault occurs, ID of the particular fault detection rule triggered, etc.) may be used to identify and retrieve a corresponding fault emissions model in step 711. As described above, a fault emissions model may include a plurality of parameters including an expression or equation defining the model. For example, a fault emissions model may include an expression or an equation that includes one or more variables relating to at least an amount of energy consumed by a building device, a time period of the fault, and/or an amount of a resource consumed by the device.

In some embodiments, a fault emissions model is modified based on a format or a unit of measurement of the operating data and/or based on a preferred unit of measurement for display (e.g., a user defined unit of measurement). In some such embodiments, the fault emissions model is modified such that each term of the model is defined by a common unit of measurement, rather than modifying a fault detection rule or the received operating data (e.g., at step 709). In some embodiments, a fault emissions model (e.g., and/or the fault emissions model generator 676) is configured to automatically detect units of measurements, such as based on the input operating data, to adjust the fault emissions model itself, or an output of the fault emissions model. For example, operating data in various different formats or units of measurement may be input to the fault emissions model, and the fault emissions model may be configured to automatically convert the disparate data into a common format, and output a result in the common format.

In some embodiments, step 711 also includes determining the time period (i.e., duration) of the fault condition, and/or estimating the amount of time that the building device will experience the fault. For example, the fault emissions model may be analyzed for a period of time between the detection of the fault and a present time, to determine an amount of energy wasted up to a current moment (e.g., in real-time). Alternatively, the fault emissions model may be analyzed over the estimated period of time that extends into the future, to estimate the amount of wasted energy. In some embodiments, the estimated period of time for a fault may be determined based on historical data, or based on a determination of when a technician can reach the device for service. In some embodiments, building device data, as well as data from virtual meters or virtual data points may be used, for example, in a digital twin, to determine trends and predict future faults. A predicted amount of energy wasted, emissions generated, and duration of the fault can be determined based on trends from previous data readings. Some faults or types of faults may be temporary faults that typically resolve themselves without the need for corrective action. In some embodiments, the amount of time that the building device will experience the fault is estimated based on a history of past faults and corresponding time periods during which the faults persisted before resolving themselves. Other faults or types of faults may be permanent faults that typically do not resolve themselves unless corrective action is taken. In some embodiments, the amount of time that the building device will experience the fault is estimated based on how soon a service technician can correct the fault. For example, system 600 may determine a work order schedule and/or a technician's schedule to determine the earliest time that the technician can correct the fault. In yet another example, the fault emissions model may be analyzed for a period of time between the detection of the fault and a time when the fault is corrected or the device is turned off.

In some embodiments, the amount of energy wasted over a time period of the fault condition is determined at a regular time interval, such as based on the rate at which operating data is received. For example, the fault emissions model may be used to determine emissions generated at each time step where new operating data is received from a building device. In some embodiments, data may be received from each data point at the same time based on an interval defined by user input. In some embodiments, the rate at which the fault emissions model is used to determine the amount of energy wasted is dynamically adjusted to match the rate at which data is received, or to account for missing data points. For example, if data from a single data point required for the determination of energy wasted is not available (e.g., the value was not captured, the corresponding device or sensors reads at a different rate than the other sensors, etc.), then the energy wastage may not be calculated for that time step. As described above with reference to step 710 of method 700, the BMS may automatically add or correct data based on data point type when data from a data point is not available. For example, the BMS may use historical data to estimate missing or suspected erroneous data (e.g., the most recent measurement, the average measurement over a predetermined period of time, interpolated data based on a previous measurement and a subsequent measurement etc.).

At step 713, an amount of emissions generated due to the fault is determined based on the amount of energy wasted. As described above, the amount of emissions generated due to the fault may be calculated based on the fault emissions model and/or based on an output of the fault emissions model. In some embodiments, calculating the amount of emissions generated includes determining the amount of emissions per unit of each power source used to generate the wasted energy and multiplying the cost of the resource by the amount of energy wasted. In some embodiments, the amount of emissions generated due to a fault may be calculated at one or more individual time steps, such as based on a rate for the consumed resource that changes over time, and the individual time steps may be aggregated to determine the amount of emissions generated. In some embodiments, determining an amount of emissions generated may not necessarily require determining a specific numerical amount of emissions, but could include making a binary determination (i.e., emissions present or emissions absent).

In some embodiments, step 713 includes obtaining current or recent energy mix data from a resource supplier prior to calculating the emissions generated due to the fault. Energy mix data may include the percentage of electricity supplied by the resource supplier that is generated from renewable sources or fossil fuels, as well as the type of renewable (e.g., solar, wind, hydroelectric, etc.) or fossil fuel (e.g., coal, natural gas, petroleum, etc.) used. Energy mix data may also include the percentage of varying components of fuels, such as natural gas, supplied directly to the building devices. For example, the energy mix data may include the percentages of methane, ethane, propane, butane, etc. in the natural gas. This data may be obtained from the resource supplier or from sensor readings or test data. Energy mix data may be obtained by accessing a website, server, cloud-hosted database, or other data source for a resource provider (e.g., a power company), or the energy mix data may be received at a regular interval from the resource provider. In this example, the resource provider may regularly publish or update energy mix data, which are then pushed to customers (e.g., system 600). Accordingly, the most current energy mix data may be utilized when calculating the emissions generated due to the fault, to provide a more accurate calculation of the emissions generated. Determining and updating the energy mix data can better identify and prioritize higher-emission faults. For example during the day, when a relatively high percentage of the electricity is generated using solar power, a first fault that results in a building device burning excess natural gas may be prioritized over a second fault that results in a building device wasting electricity. At night, when a higher percentage of the electricity is generated by burning coal, the second fault may be prioritized over the first fault.

At step 715, an automated response is initiated based on the detection of the fault and/or the calculated emissions generated due to the fault. As discussed above, automated responses may include generating a work order for the detected fault and automatically scheduling a visit from a technician to correct the fault. A work order may indicate a type of fault, a device and location of the device experiencing the fault, a time and date that the fault was detected, and any other relevant fault information that may aid a technician in diagnosing and correcting the fault. The automated response may also include a prioritization of multiple work orders based on the relative amount of emissions generated by each fault. In some embodiments, generating the work order may also include automatically scheduling a service call or a technician visit. For example, a work order log or a technician schedule may be referenced to identify and reserve a period of time that the technician can correct the fault. In some embodiments, a notification that a work order has been created may also be transmitted to a device associated with the assigned technician.

In some embodiments, the automated response includes generating and transmitting (e.g., to a user device), an alert identifying the fault and indicating the emissions generated due to the fault. For example, a notification may be sent via a text message, an email, a voice call, a push notification, or by any other method to user device (e.g., associated with a technician or building manager). In some embodiments, the automated response includes generating one or more user interfaces that display information identifying the fault and the affected device, and presenting the emissions information calculated at step 713. For example, a user interface can be presented via user device 632 that include graphs, text, images, and other elements for presenting fault information. Additional user interfaces are described in greater detail below.

Figure 7D:
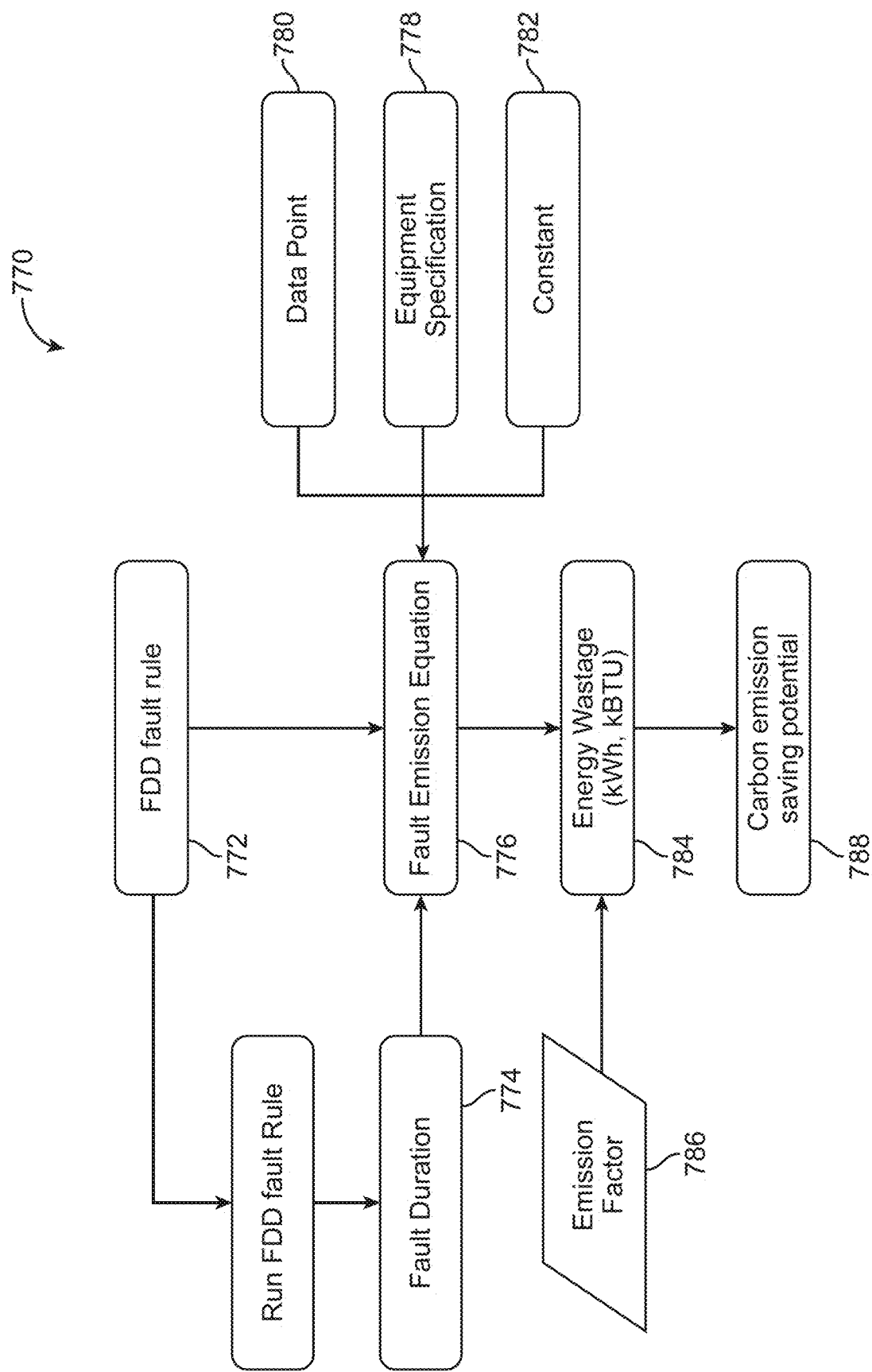
FIG. 7D is a chart illustrating the data flow that takes place in method of FIG. 7B.

FIG. 7D is a flow chart 770 further illustrating the method 700. The fault detection rule 772 is created and repeatedly run, for example, at regular intervals as described above. The fault duration 774 is based on how long the fault detection rule continues to identify an active fault. A fault emission equation 776 receives the fault detection rule, the fault duration, and information about the equipment (e.g., the equipment specifications 778, data points 780 from sensors and other feedback mechanisms, and constants 782 relating to the equipment). The fault emission equation 776 identifies the amount of each type of energy wasted 784 (e.g., electrical, thermal, etc.). An emission factor 786 (e.g., the amount of emissions generated per unit of the type energy wasted) is received by the resource provider and used to calculate the emissions generated due to the fault and the carbon emission saving potential 788. In some embodiments, the fault emission calculations are substantially similar to the fault cost calculations except that, instead of a cost per unit of each source of energy, the emissions per unit of each source of energy are used to calculate the total emissions.

Figure 8:
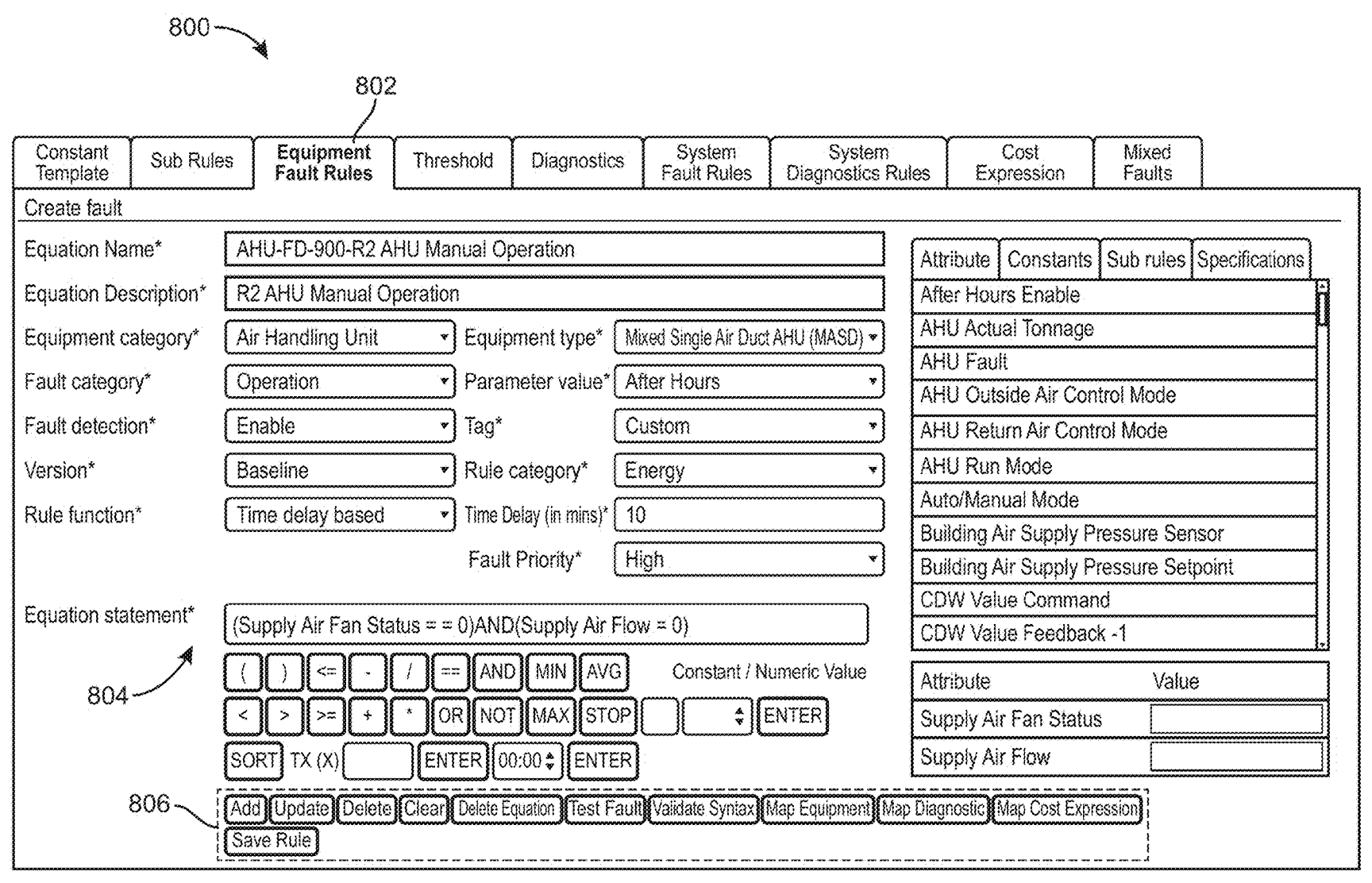

Referring now to FIG. 8, an example interface 800 for establishing fault detection rules is shown, according to some embodiments. As with the other example interfaces discussed herein, interface 800 may be generated by UI generator 620 and may be presented via user device 632. Interface 800 may allow a user to input new fault detection rules, modify existing fault detection rules, and/or test and validate rules, among numerous other features.

Interface 800 is shown to include a number of tabs that can be selected to view various pages, for performing various tasks. For example, a user may select "System Fault Rules" to define new system-level fault rules or to modify existing system-level fault rules. In the example shown, a user has selected "Equipment Fault Rules" tab 802 to create an equipment fault rule. Interface 800 includes a number of fields that the user can populate when defining/creating the new rule, includes an "Equation Name" (i.e., fault name) and a description of the rule.

Other fields for population include a related equipment category ("Air Handling Unit"), an equipment type ("Mixed Single Air Duct"), a fault category ("Operation"), a parameter value ("After Hours"), an indication of fault detection status ("Enabled"), a tag for the fault ("Custom"), a fault version ("Baseline"), a rule category ("Energy"), a rule function ("Time Delay Based"), a time delay ("10 minutes"), and a fault priority ("High"). In some embodiments, at least a portion of the fields may be required prior to creating the new fault detection rule. For example, the user may be required to populate the "Equipment Category" field, but may not be required to populate the "Time Delay" field.

Interface 800 also include an "Equation Statement" field 804, where the user may enter an equation or expression (e.g., a Boolean equation) that defines the fault rule. In this example, the user has entered "(Supply Air Fan Status=0) AND(Supply Air Flow=0)." Thus, the fault rule would be deemed "true" if both the supply air fan status and the supply air flow speed for the specified air handling unit are zero. Interface 800 may also include a number of operators and/or icons that can be selected to enter or modify the equation in field 804. For example, the user can select AND, NOT, OR, etc., from the set of operators for defining the equation.

Once the equation or expression is entered, the user may select one of icons 806 to perform various operations using the newly entered fault rule parameters. For example, the user may add the new rule, or may update and existing rule. The user may also delete the selected rule or select cancel to clear the field of interface 800. Icons 806 also include elements (e.g., buttons) for testing and/or validating the new fault detection rule, mapping equipment to the new rule, mapping a cost or emissions expression to the rule, saving the rule, etc.

Referring now to FIG. 9, an example interface 900 for viewing fault data is shown, according to some embodiments. Interface 900 is shown to include a list 902 of fault currently active in a system (e.g., system 600). List 902 may indicate an equipment identifier, an identifier for a space where the equipment is located, a fault name, a time and date that the fault was detected, a fault category, a priority, a duration of the fault, and an electrical energy, thermal energy, and cost savings potential or emissions reduction potential if the fault is corrected.

Taking the first fault as an example, equipment RMU-A8-BL-V03 is indicated as experiencing a "VAV Low Supply Air Flow—Reheat" fault, which was detected at 17:00 on Mar. 4, 2020. This fault is related to comfort and is identified as a medium priority fault. In some embodiments, the user may click on the fault name (i.e., identifier), which may contain a hyperlink, thereby navigating to a second user interface that displays additional information relating to the fault. For example, the second user interface may allow the user to acknowledge the fault and/or respond to the fault by generating a work order.

Figure 10:
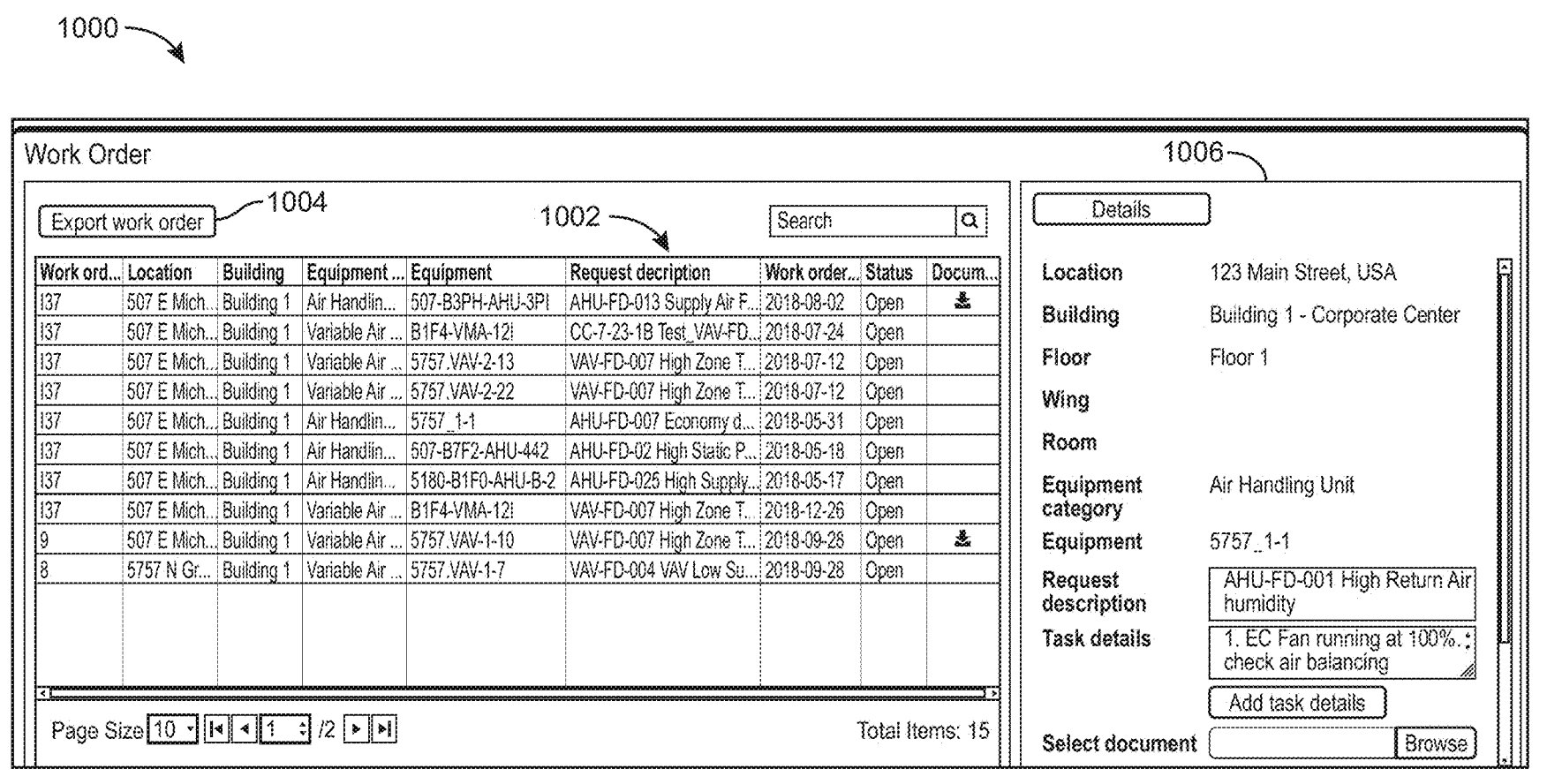

Referring now to FIG. 10, an example interface 1000 for work order management is shown, according to some embodiments. From interface 1000, a user may be able to generate and/or view various open and/or historical work orders. For example, interface 1000 includes a work order list 1002 that lists all of the work orders for a particular system (e.g., system 600). List 1002 may include information such as a work order number, a location of a device or building associated with the work order, a building identifier, an equipment type and/or identifier, a request description, a creation date and time, a status, and any available work order documentation. The user may also be able to enter a search term in a search bar to search and/or filter list 1002.

As an example, the first work order in list 1002 is work order 137 relating to an air handling unit in "Building 3." By selecting work order 137 from list 1002, a secondary interface 1004 may be presented that displays additional work order details. For example, interface 1004 displays a location, building, floor, wing, and/or room that the device is located in, as well as a category, equipment identifier, request description, and task details for the work order. The user may be able to add task details by selecting an "Add Task Detail" button, and/or may be able to upload supporting documentation via a "Select Document" field. The user may also be able to export one or more selected work orders (e.g., to a user device associated with a technician, to a remote work order system, etc.) via an "Export Work Order" icon 1006.

Referring now to FIG. 11, an example data point setup interface 1100 for setting the read frequency of a data point is shown, according to some embodiments. The data point can be used to determine if a fault detection rule detects a fault. A user can enter a data point name 1102 identifying the device or sensor from which the data point reading is taken. The user can also choose a unit type 1104 and a point role 1106, identifying the type of measurement that is being taken. The user may select a read frequency 1108 for the data point, which determines how often a reading is taken from the sensor or other device. In some embodiments, all data points within a system or subsystem may have identical read frequencies such that the cost or emission calculations can be performed without taking into account a large amount of different read frequencies. The user may also select the unit type 1110 that the sensor or device outputs. Because the data point includes the unit type, the fault cost or emissions equations can easily convert all of the readings with the same unit type to the same unit. Alternatively, the data point itself can be immediately converted to a common unit. For example, if some devices read pressure in inches of water and other read pressure in psi, the user may identity the units output by the sensor or device in the data point, and the data point may automatically convert the measurements taken in inches of water and convert them to psi before reporting the measurements to the fault cost or emissions equation. Thus, the fault cost or emissions equation receives all of the readings for a given unit type in the same unit of measure.

Figure 12:
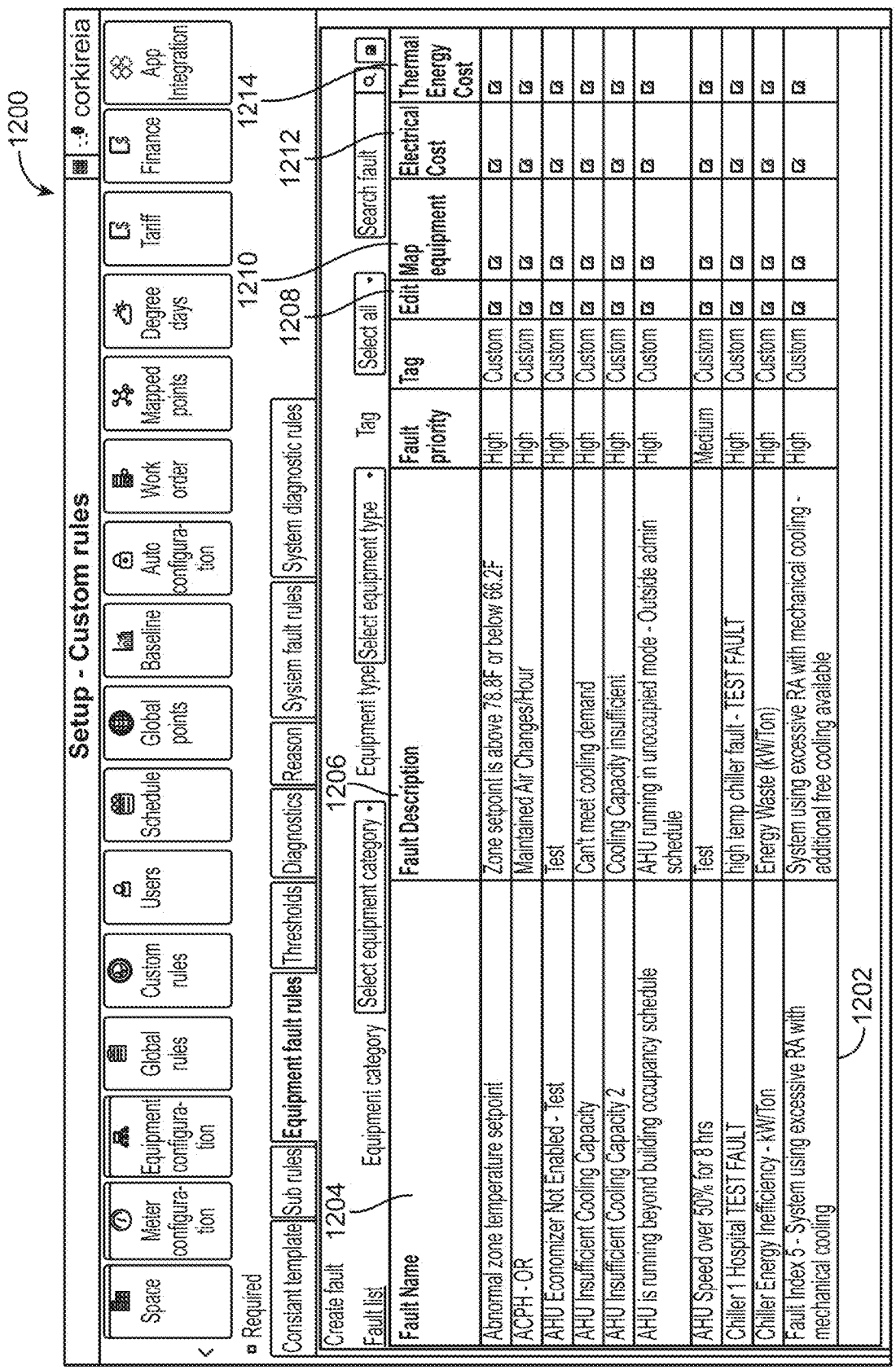
FIG. 12 is an example interface for viewing a fault list, according to some embodiments.
Figure 13:
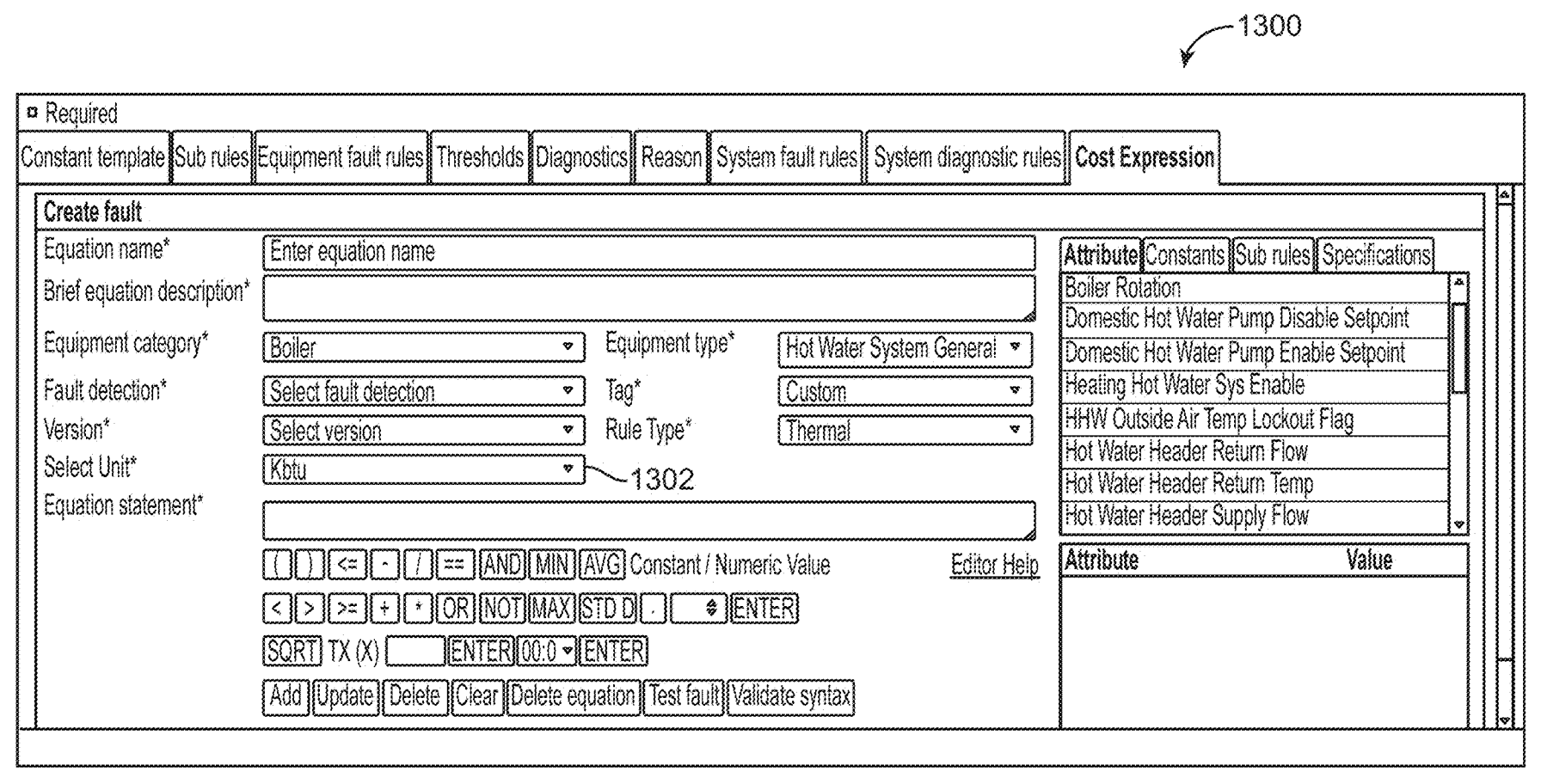

FIGS. 12-14 show interfaces 1200, 1300, 1400 for setting up fault rules and a fault cost equation or fault emission equation. Referring now to FIG. 12, the interface 1200 includes a fault list 1202 including fault names 1204 and corresponding fault descriptions 1206. Each fault in the list has corresponding edit buttons to edit the entry, for example, fault information edit buttons 1208, equipment mapping buttons 1210 linking to an entry form for mapping building equipment to the corresponding fault rule, electrical cost buttons 1212 linking to an entry form for setting up the electrical cost equations, and thermal cost buttons 1214 linking to an entry form for setting up the thermal cost equations. In some embodiments, each entry may also include an emissions equation button. In other embodiments, the emissions calculation may be included in the electrical and thermal cost equation entry forms.

Referring now to FIG. 13, the interface 1300 is an entry form for entering the fault cost or emissions equation and is substantially similar to FIG. 8. Interface 1300 can be accessed, for example, by selecting the thermal cost button 1214 of one of the faults from the list 1202. In some embodiments, the data points sent to the fault cost or emissions equation are all the same because they are translated by a data point function before being sent to the equation. In these embodiments, the unit dropdown 1302 may default to a particular unit based on the equipment category, the type of fault detection, and/or the rule type, and may not be user-selectable within interface 1300.

Referring now to FIG. 14, the interface 1400 is list of faults generated by executed fault detection and cost and emissions equations. Interface is substantially similar to interface 900, but also includes the calculated carbon emission cost 1402 of each fault.

Referring now to FIGS. 15A-15D, a table 1500 is shown identifying several electrical and thermal cost rules. Row 1 includes an electrical cost rule and a thermal cost rule for an air handling unit experiencing a high static pressure fault. The electrical cost rule determines an amount of kWh wasted due to the fault according to the equation:

$$\text{Supply Air flow}*(\text{Supply Air Static Pressure}-\text{Supply Air Pressure Setpoint})/(6356*0.75))*0.746))$$

The electrical cost rule in Row 1 is dependent on the supply air flow and difference between a supply air pressure setpoint and the measured static air pressure. Adjustments to the calculated electrical waste can be made based on the fan efficiency and the units of measure used by the pressure and flow sensors, as well as converting from horsepower to output the total electrical energy wastage in kilowatt-hours.

The thermal cost rule determines an amount of kBTU wasted due to the fault according to the equation:

$$(0.3*1.08*(\text{Heating Output}/100)*\text{Supply Air Flow}*(\text{Supply Air Temperature}-\text{Mixed Air Temperature})/1000))$$

The thermal cost rule in Row 1 is dependent on the supply air flow, the heating output percentage, and the difference between the supply air temperature and the mixed air temperature in the air handling unit. Adjustments to the calculated thermal waste can be made based on the units of measure used by the airflow sensor and an assumed wastage percentage in order to output the total thermal energy wastage in kBTU.

Row 2 includes an electrical cost rule for an air handling unit experiencing a fault in which it does not run on its energy-saving economy cycle. The electrical cost rule determines an amount of kWh wasted due to the fault according to the equation:

$$(((4.5*\text{Outside Air Flow}*\text{Outside Air Enthalpy})/12000)*0.85)$$

The electrical cost rule in Row 2 is dependent on the outside air flow and the outside air enthalpy. Adjustments to the calculated electrical waste are made based on the units of measure used by the airflow and enthalpy sensors in order to output the total electrical energy wastage in kilowatt-hours.

Row 3 includes an electrical cost rule and a thermal cost rule for an air handling unit experiencing a fault in which it operates permanently at full load. The electrical cost rule determines an amount of kWh wasted due to the fault according to the equation:

$$(((\text{Supply Air Flow}*(\text{Supply Air Static Pressure}-\text{Supply Air Pressure Setpoint})/(6356*0.75))*0.746)+((\text{Supply Air Flow}/400)*0.03*0.85))$$

The electrical cost rule in Row 3 is dependent on the supply air flow and difference between a supply air pressure setpoint and the measured static air pressure. Adjustments to the calculated electrical waste can be made based on the chiller plant efficiency and the units of measure used by the pressure and flow sensors, as well as converting from horsepower to output the total electrical energy wastage in kilowatt-hours.

The thermal cost rule determines an amount of kBTU wasted due to the fault according to the equation:

$$((0.3*1.08*(\text{Heating Output}/100)*\text{Supply Air Flow}*(\text{Supply Air Temperature}-\text{Mixed Air Temperature}))/1000))$$

The thermal cost rule in Row 3 is dependent on the supply air flow, the heating output percentage, and the difference between the supply air temperature and the mixed air temperature in the air handling unit. Adjustments to the calculated thermal waste can be made based on the units of measure used by the airflow sensor and an assumed wastage percentage in order to output the total thermal energy wastage in kBTU.

Row 4 includes an electrical cost rule for an air handling unit experiencing a low zone temperature fault. The electrical cost rule determines an amount of kWh wasted due to the fault according to the equation:

$$(((((1.08*\text{Supply Air Flow}*(\text{Space Temperature Setpoint}-\text{Space Temperature}))/12000)*0.85)*(\text{Cooling Output}/\text{Cooling Output}))$$

The electrical cost rule in Row 4 is dependent on the supply air flow and the difference between a space temperature setpoint and a measured space temperature. Adjustments to the calculated electrical waste are made based on the units of measure used by the airflow sensor, the chiller plant efficiency, and the cooling output percentage of the air handling unit in order to output the total electrical energy wastage in kilowatt-hours.

Row 5 includes an electrical cost rule and a thermal cost rule for an air handling unit experiencing a simultaneous heating and cooling fault. The electrical cost rule determines an amount of kWh wasted due to the fault according to the equation:

$$((\text{Supply Air Flow}/400)*(\text{Cooling Output}/100)*0.85*0.8)$$

The electrical cost rule in Row 5 is dependent on the supply air flow and the cooling output percentage. Adjustments to the calculated electrical waste can be made based on the chiller plant efficiency, the units of measure used by the airflow sensor and a confidence factor and the total electrical energy wastage is output in kilowatt-hours.

The thermal cost rule determines an amount of kBTU wasted due to the fault according to the equation:

$$(((\text{Heating Output}/100)*\text{Const}(\text{Heating Capacity (MBH)}))*0.85*0.8)$$

The thermal cost rule in Row 5 is dependent on the heating output percentage and a heating capacity constant. Adjustments to the calculated thermal waste can be made based on the boiler efficiency and a confidence factor, and the total thermal energy wastage is output in kBTU.

Row 6 includes an electrical cost rule and a thermal cost rule for an air handling unit experiencing a low carbon dioxide fault. The electrical cost rule determines an amount of kWh wasted due to the fault according to the equation:

$$((1.08*\text{Supply Air Flow}*((\text{Outdoor Air Damper output}-20)/100))*(\text{Outside Air Temperature}-\text{Supply Air Temperature})/12000)*0.85)$$

The thermal cost rule determines an amount of kBTU wasted due to the fault according to the equation:

$$((1.08*\text{Supply Air Flow}*(\text{Outdoor Air Damper output}-20))*(\text{Supply Air Temperature}-\text{Outside Air Temperature}))/1000)$$

The electrical and thermal cost rules in Row 6 are dependent on the supply air flow, the outdoor air damper output percentage minus 20 percent, and the difference between the outside air temperature and the supply air temperature. Adjustments to the calculated electrical and thermal waste can be made based on the units of measure used by the airflow and temperature sensors. The total electrical energy wastage is output in kilowatt-hours, and the total thermal energy wastage is output in kBTU.

Row 7 includes an electrical cost rule for a fan coil unit experiencing a low zone temperature fault. The electrical cost rule determines an amount of kWh wasted due to the fault according to the equation:

$$((((1.08*Const(FCUDESIGNFLOW)*(\text{Zone Temperature Setpoint}-\text{Zone Temperature}))/12000)*0.85)*(\text{Cooling Output}/\text{Cooling Output}))$$

The electrical cost rule in Row 7 is dependent on a design flow constant, the difference between the zone temperature setpoint and the measured zone temperature, and the cooling output percentage. Adjustments to the calculated electrical waste are made based on the chiller plant efficiency and the unit of measure used by the temperature sensor in order to output the total electrical energy wastage in kilowatt-hours.

Row 8 includes an electrical cost rule and a thermal cost rule for a rooftop unit experiencing a fault in which outside and return air dampers are both open. The electrical cost rule determines an amount of kWh wasted due to the fault according to the equation:

$$(((1.08*(\text{Supply Air Flow}*(\text{Outdoor Air Damper Output}-20))*(\text{Outdoor Air Temperature}-\text{Supply Air Temperature}))/12000)*0.85))$$

The thermal cost rule determines an amount of kBTU wasted due to the fault according to the equation:

$$((1.08*(\text{Supply Air Flow}*(\text{Outdoor Air Damper Output}-20))*(\text{Supply Air Temperature}-\text{Outdoor Air Temperature}))/1000)$$

The electrical and thermal cost rules in Row 8 are dependent on the supply air flow, the outdoor air damper output percentage minus 20 percent, and the difference between the outside air temperature and the supply air temperature. Adjustments to the calculated electrical and thermal waste can be made based on the units of measure used by the airflow and temperature sensors. The total electrical energy wastage is output in kilowatt-hours, and the total thermal energy wastage is output in kBTU.

Row 9 includes an electrical cost rule for a rooftop unit experiencing a low zone temperature fault. The electrical cost rule determines an amount of kWh wasted due to the fault according to the equation:

$$(((1.08*\text{Supply Air Flow}*(\text{Zone Average Temperature Set point}-\text{Zone Average Temperature}))/12000)*1.2)$$

The electrical cost rule in Row 9 is dependent on the supply air flow, the difference between the zone temperature setpoint and the measured zone temperature, and the cooling output percentage. Adjustments to the calculated electrical waste are made based on the rooftop unit efficiency and the units of measure used by the temperature sensor and airflow sensor in order to output the total electrical energy wastage in kilowatt-hours.

Row 10 includes an electrical cost rule for chilled water pumps experiencing a fault in which the pump operation is at high. The electrical cost rule determines an amount of kWh wasted due to the fault according to the equation:

$$(\text{Pump }VSD\text{ Power}) - (\text{Pump }VSD\text{ Power}/$$
$$(((\text{Pump Speed Drive Output}/Const(\text{High Speed Threshold}))*$$
$$(\text{Pump Speed Drive Output}/Const(\text{High Speed Threshold}))*$$
$$(\text{Pump Speed Drive Output}/Const(\text{High Speed Threshold})))))$$

The electrical cost rule in Row 10 is dependent on the variable speed drive power, the variable speed drive output and a high speed threshold constant. Adjustments to the calculated electrical waste are made based on the units of measure used by the wattmeter in order to output the total electrical energy wastage in kilowatt-hours.

Row 11 includes an electrical cost rule for a chiller experiencing a poor plant efficiency fault. The electrical cost rule determines an amount of kWh wasted due to the fault according to the equation:

$$((\text{Total Plant Room System Efficiency}-(Const(\text{CHW Plant SYS Efficiency}-\text{Design})*Const(\text{Design Efficiency Multiplier})))*\text{Total Chiller Load}))$$

The electrical cost rule in Row 11 is dependent on the total plant room system efficiency, a plant room system efficiency constant, and a design efficiency multiplier constant. The total electrical energy wastage is output in in kilowatt-hours.

Row 12 includes an electrical cost rule for a chiller experiencing a high condenser water header supply temperature fault. The electrical cost rule determines an amount of kWh wasted due to the fault according to the equation:

$$((\text{Condenser Water Header Supply Temperature}-29.5)*0.03*\text{Total Chiller Power})$$

The electrical cost rule in row 12 is dependent on the condenser water header supply temperature and the total chiller power and is adjusted based on the unit of measure of the temperature sensor. The total electrical energy wastage is output in in kilowatt-hours.

Row 13 includes an electrical cost rule for a chiller experiencing a fault in which the air handling unit return air temperature is too cold. The electrical cost rule determines an amount of kWh wasted due to the fault according to the equation:

$$(0.0002*(Const(\text{RAT LowLimit})-\text{Return Air Temperature})*((40/50)*Const(\text{AHU Design Airflow})))$$

The electrical cost rule in Row 13 is dependent on the return air temperature, a lower limit temperature constant, and a design airflow constant. Adjustments to the calculated electrical waste are made based on the units of measure used by the temperature sensor in order to output the total electrical energy wastage in kilowatt-hours.

Any of the electrical and thermal cost rules may include a MAX function such that only operating conditions that return a positive value for energy wasted are identified as faults.

In some embodiments, the fault emission equations can use the values determined by the electrical and thermal cost rules above. For example, the total electrical energy wastage can be multiplied by a first carbon emission factor determined by the amount of carbon emitted per kWh of electricity generated. The total thermal energy wastage can be multiplied by a second carbon emission factor determined by the amount of carbon emissions generated per kBTU of thermal energy. In some embodiments, the fault emission equations can directly determine the emissions generated without first calculating the amount of energy wasted and entering the amount of energy wasted into an additional equation. In some embodiments, the fault emissions model may be analyzed over an estimated period of time that extends into the future, to predict the amount of emissions generated. In some embodiments, building device data, as well as data from virtual meters or virtual data points, for example, in a digital twin, may be used to determine trends and predict future faults, as well as the amount of emissions expected from future faults. A predicted amount of emissions due to a predicted fault can be determined based on trends from previous data readings. Predicted faults and current faults may be assigned priority values based on expected and/or actual emissions. For example, a predicted fault expected to generate a large amount of emissions may be prioritized over a current fault that is generating a relatively low amount of emissions. Preventative maintenance may be performed to prevent the predicted fault before repairs are performed to remedy the current fault.

Referring now to FIG. 16, a commodity rate setup interface 1600 for entering the cost and carbon emission of energy sources is shown, according to some embodiments. A user can enter the unit of measure for various fuel source, the cost per unit for each energy source, and the emissions per unit of each fuel source (not shown). The user can enter an emissions factor per unit of electricity that, when multiplied by a number of kWh, can be used to determine the amount of carbon emissions generated due to electricity waste. In some embodiments, the cost and emissions per unit for each energy source can be manually or periodically automatically retrieved from a resource provider. For example, the cost and emissions generated per unit of electricity may vary depending on time of day, time of year, energy mx, etc.

Figure 17:
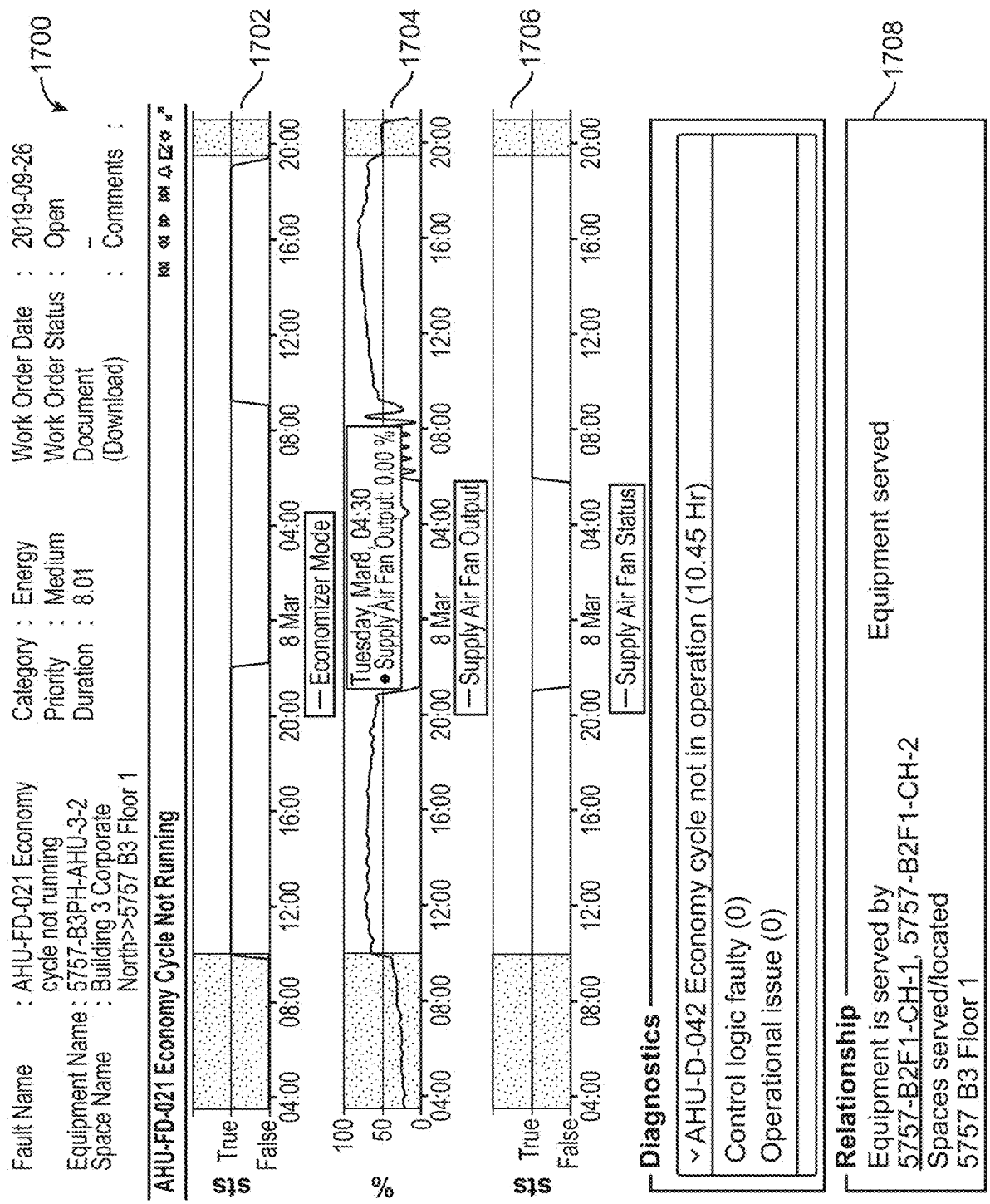
FIG. 17 is an example interface for viewing fault information, according to some embodiments.

Referring now to FIG. 17, an interface 1700 for viewing fault information is shown, according to some embodiments. The fault detection rule relates to detecting an air handling unit (AHU) fault in which the AHU does not run on its energy-saving economy cycle. The upper graph 1702 shows that the AHU is programmed to turn off periodically to conserve electricity when a space served by the AHU is expected to be unoccupied. The AHU output graph 1704 and the AHU status graph 1706 show that the AHU remained active during the periods that it was scheduled to be powered off. For example the AHU was powered on before 10:00 AM on March 7 and from 6:00 AM to 9:00 AM and after 9:30 PM on March 8, all times that the AHU should have been powered off, according the upper graph 1702.

Fault detection interface 1700 also includes a relationship window 708 in which relationships between different building equipment are identified. The relationships may include equipment that serves the AHU, equipment that the AHU itself serves, building spaces that the AHU serves and other devices that also serve the same building space. In some embodiments, the fault cost and emissions equations take into account these relationships in determining the cost of and emissions generated due to a fault. For example, the fault detection interface 1700 indicates that the AHU was powered off when it was scheduled to be on, from about 9:30 PM to about 10:00 PM on March 7. Because the AHU is powered off, this fault could theoretically reduce the cost and emissions generated by the AHU during that time period. However, if the AHU and a second AHU serve the same building space, the second AHU may use additional electricity to supplement for the fault in the first AHU. Thus, the fault cost and emissions equations can take into account the increased load on the second AHU when determining the cost of and emissions generated due to the fault.

Figure 18:
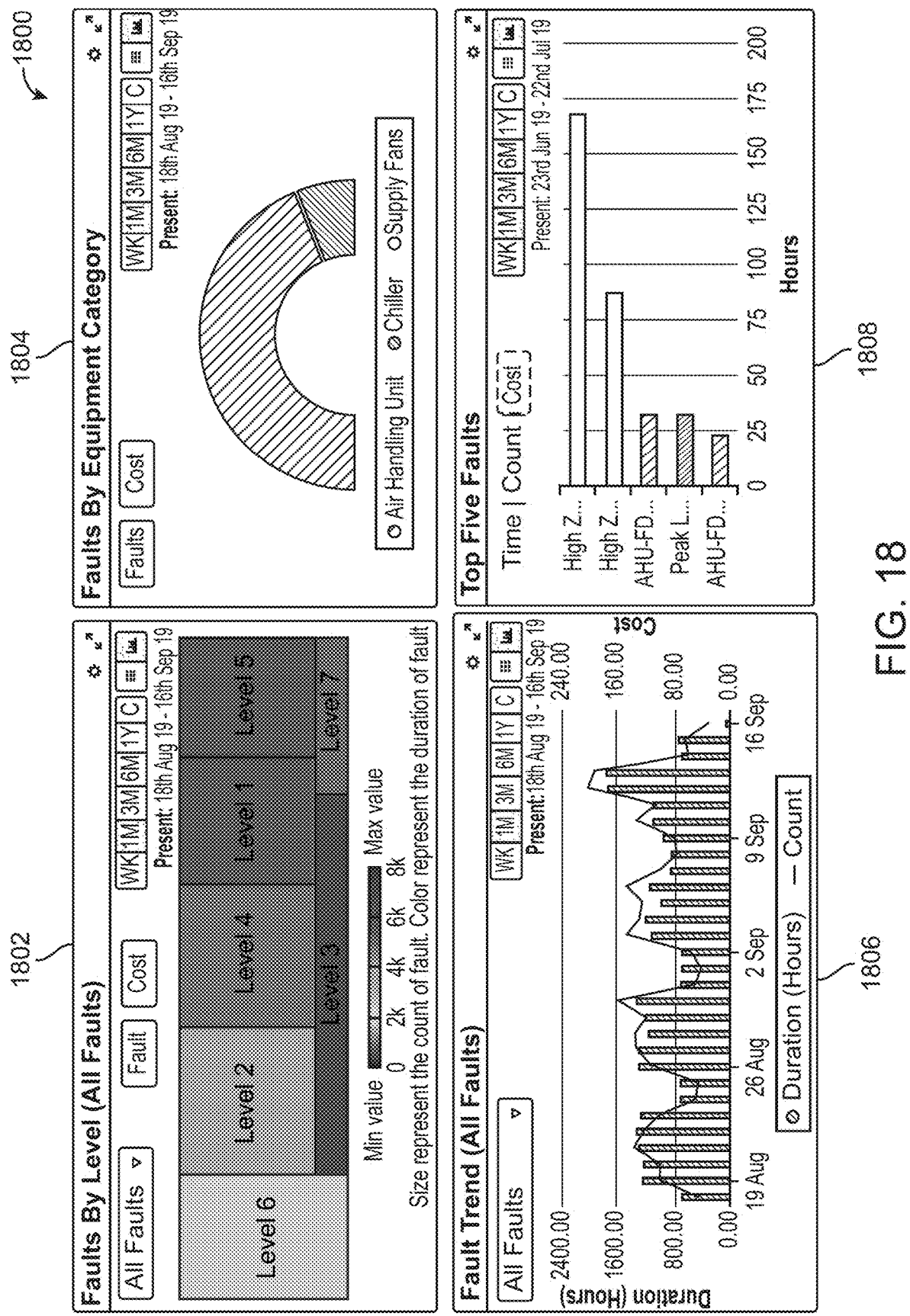
FIG. 18 an example interface for viewing statistical fault data, according to some embodiments.

Referring now to FIG. 18, an interface 1800 is a set of views showing various statistical fault data. View 1802 is a visual representation of the fault count and duration by level. For each level, the size of the box represents the number of faults, while the color of the box represents the average duration of the faults. View 1804 is a pie chart showing the percentage of each fault by equipment category (e.g., air handling units, chillers, supply fans, etc.). View 1806 is a fault trend graph showing the total number of faults per day. View 1808 lists the top five faults in a selected time period. The user can select whether to show the top five faults by cost, duration, or count.

Figure 19:
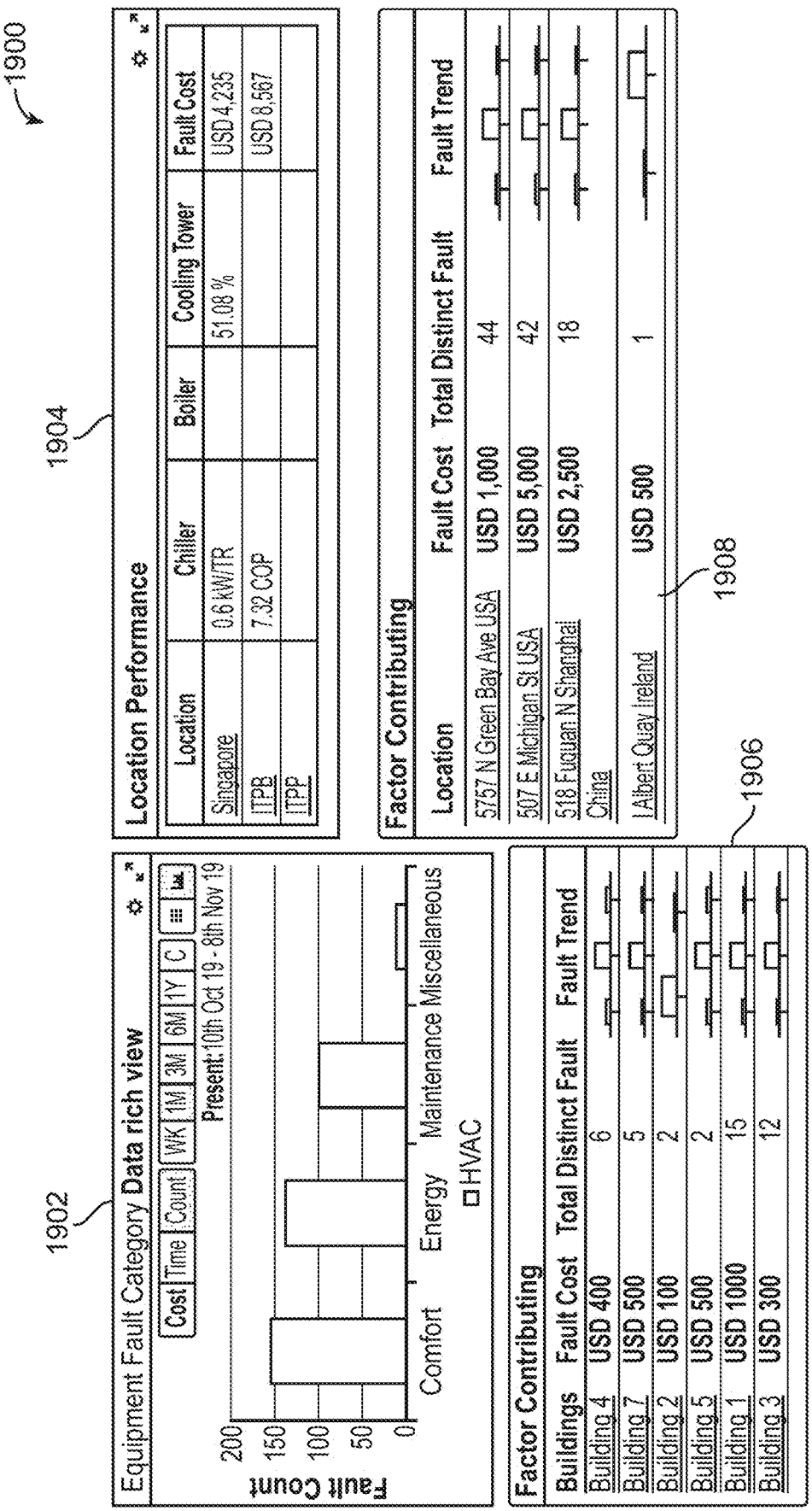
FIG. 19 an example interface for viewing statistical fault data, according to some embodiments.

Referring now to FIG. 19, an interface 1900 is a set of views showing various statistical fault data. View 1902 categorizes a set of faults according to the type of fault (e.g., comfort faults, energy faults, maintenance faults, and miscellaneous faults). View 1904 lists collective fault costs of various locations. Views 1906 and 1908 respectively list the collective fault costs and the number of faults by building and by site.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) comprising:
one or more memory devices having instructions stored thereon that, when executed by one or more processors, cause the one or more processors to perform operations comprising:
obtaining operating data from a plurality of building devices;
using the operating data to evaluate one or more fault detection rules to determine whether at least one of the plurality of building devices is experiencing a fault condition;
in response to determining that at least one of the plurality of building devices is experiencing the fault condition, determining an amount of carbon emissions generated due to the fault condition based on a fault emissions model associated with the fault condition, wherein determining the amount of carbon emissions generated due to the fault condition comprises predicting additional carbon emissions generated by operating a second building device to compensate for the fault condition in a first building device; and
initiating an automated response based on the amount of carbon emissions associated with the fault condition, the automated response comprising operating the second building device to compensate for the fault condition in the first building device.

2. The BMS of claim 1, the operations further comprising:
obtaining at least one of the one or more fault detection rules based on a user input; and mapping the one or more fault detection rules to the plurality of building devices.

3. The BMS of claim 2, wherein the user input comprises a description of a fault associated with a fault detection rule of the one or more fault detection rules, a priority of the fault, and an equation defining the fault detection rule.

4. The BMS of claim 1, the operations further comprising modifying the fault emissions model based on units of measurement associated with the operating data, wherein the fault emissions model is modified such that each term of the fault emissions model is defined by a common unit of measurement.

5. The BMS of claim 1, the operations further comprising calculating an amount of energy wasted due to the fault condition based the fault emissions model associated with the fault condition, wherein the amount of carbon emissions generated is determined based on the amount of energy wasted and energy mix information including the energy sources used to generate the wasted energy.

6. The BMS of claim 1, wherein the automated response further comprises generating a work order to correct the fault condition, the work order identifying the at least one of the plurality of building devices experiencing the fault condition and comprising a description of the fault and a location of the at least one of the plurality of building devices.

7. The BMS of claim 1, wherein the automated response further comprises:
generating a graphical user interface based on the fault condition, the graphical user interface comprising an indication of the fault condition, an indication of the at least one of the plurality of building devices experiencing the fault condition, and an indication of the carbon emissions generated; and
displaying the graphical user interface via a user device.

8. The BMS of claim 1, wherein the automated response further comprises:
generating an alert based on the detection of the fault condition, the alert comprising an indication of a priority of the fault condition, wherein the priority is determined based on the amount of carbon emissions generated due to the fault; and
transmitting the alert to a user device.

9. A method of determining an amount of carbon emissions due to a fault condition in a building management system (BMS), the method comprising:
obtaining operating data from a plurality of building devices;
using the operating data to evaluate one or more fault detection rules to determine whether at least one of the plurality of building devices is experiencing the fault condition;
in response to determining that at least one of the plurality of building devices is experiencing the fault condition, determining an amount of carbon emissions generated due to the fault condition based on a fault emissions model associated with the fault condition, wherein determining the amount of carbon emissions generated due to the fault condition comprises predicting additional carbon emissions generated by operating a second building device to compensate for the fault condition in a first building device; and
initiating an automated response based on the amount of carbon emissions associated with the fault condition, the automated response comprising operating the second building device to compensate for the fault condition in the first building device.

10. The method of claim 9, further comprising:
receiving, via a user input to a user device, at least one of the one or more fault detection rules; and
mapping the one or more fault detection rules to the plurality of building devices.

11. The method of claim 10, wherein the user input comprises a description of a fault associated with a fault detection rule of the one or more fault detection rules, a priority of the fault, and an equation defining the fault detection rule.

12. The method of claim 9, further comprising modifying the fault emissions model based on units of measurement associated with the operating data, wherein the fault emissions model is modified such that each term of the fault emissions model is defined by a common unit of measurement.

13. The method of claim 9, further comprising calculating an amount of energy wasted due to the fault condition based the fault emissions model associated with the fault condition and energy mix information, wherein the amount of energy wasted is determined by comparing a first amount of energy consumed by the at least one of the plurality of building devices over a time period of the fault condition with a second amount of energy consumed by the at least one of the plurality of building devices during a time period of normal operation, and wherein the amount of carbon emissions generated is determined based on the amount of energy wasted and energy mix information including the energy sources used to generate the wasted energy.

14. The method of claim 13, wherein the amount of energy wasted due to a fault condition in the first building device includes additional energy consumed by the second building device because of the fault in the first building device.

15. The method of claim 9, wherein the automated response further comprises generating a work order to correct the fault condition, the work order identifying the at least one of the plurality of building devices experiencing the fault condition and comprising a description of the fault and a location of the at least one of the plurality of building devices.

16. The method of claim 9, wherein the automated response further comprises:

generating a graphical user interface based on the fault condition, the graphical user interface comprising an indication of the fault condition, an indication of the at least one of the plurality of building devices experiencing the fault condition, and an indication of the carbon emissions generated; and displaying the graphical user interface via a user device.

17. The method of claim 9, wherein the automated response further comprises:

generating an alert based on the detection of the fault condition, the alert comprising an indication of a priority of the fault condition, wherein the priority is determined based on the amount of carbon emissions generated due to the fault; and transmitting the alert to a user device.

18. A fault detection system comprising:

one or more memory devices having instructions stored thereon that, when executed by one or more processors, cause the one or more processors to perform operations comprising:

receiving, via a user input, at least one fault detection rule, the at least one fault detection rule comprising an equation defining the at least one fault detection rule;

mapping the at least one fault detection rule to one or more building devices; obtaining operating data from the one or more building devices;

using the operating data to evaluate the at least one fault detection rule to determine that a building device of the one or more building devices is experiencing a fault condition;

determining an amount of carbon emissions generated due to the fault condition based on a fault emissions model associated with the fault condition, wherein determining the amount of carbon emissions generated due to the fault condition comprises predicting additional carbon emissions generated by operating a second building device to compensate for the fault condition in a first building device; and initiating an automated response based on the amount of carbon emissions associated with the fault condition, the automated response comprising operating the second building device to compensate for the fault condition in the first building device.

19. The system of claim 18, wherein the automated response further comprises generating a work order to correct the fault condition, the work order identifying the building device experiencing the fault condition and comprising a description of the fault and a location of the building device.

* * * * *